(12) United States Patent
Ohno et al.

(10) Patent No.: US 7,761,868 B2
(45) Date of Patent: Jul. 20, 2010

(54) INFORMATION RECORDING METHOD AND OPTICAL DISK

(75) Inventors: Hirotoshi Ohno, Yokohama (JP); Toshio Kuroiwa, Yokohama (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 1319 days.

(21) Appl. No.: 11/245,094

(22) Filed: Oct. 7, 2005

(65) Prior Publication Data

US 2006/0077771 A1 Apr. 13, 2006

(30) Foreign Application Priority Data

Oct. 8, 2004 (JP) ........................... P2004-296238
Jun. 10, 2005 (JP) ........................... P2005-170587

(51) Int. Cl.
*G06F 9/445* (2006.01)
(52) U.S. Cl. ..................................... 717/174
(58) Field of Classification Search .................. 717/174
See application file for complete search history.

(56) References Cited

U.S. PATENT DOCUMENTS

| 6,016,400 | A  * | 1/2000  | Day et al. ................... 717/175 |
| 6,415,400 | B1 * | 7/2002  | Wu et al. ..................... 714/723 |
| 6,760,288 | B2 * | 7/2004  | Ijtsma et al. .............. 369/53.18 |
| 7,054,889 | B2 * | 5/2006  | Todo et al. ................... 707/200 |
| 7,512,052 | B2 * | 3/2009  | Ohmi ....................... 369/59.25 |
| 7,533,421 | B2 * | 5/2009  | Ramsey ........................ 726/27 |
| 2001/0032213 | A1 * | 10/2001 | Todo et al. ................... 707/200 |
| 2002/0097648 | A1 * | 7/2002  | Ilda .......................... 369/47.39 |
| 2002/0172123 | A1 * | 11/2002 | Ohmi ....................... 369/59.25 |
| 2003/0026598 | A1 * | 2/2003  | Karitani ..................... 386/125 |
| 2003/0037325 | A1 * | 2/2003  | Hargrove et al. ............ 717/175 |
| 2003/0210627 | A1 * | 11/2003 | Ijtsma et al. .............. 369/53.18 |
| 2004/0047257 | A1 * | 3/2004  | Ohmi ....................... 369/47.53 |
| 2004/0086269 | A1 * | 5/2004  | Huang ........................ 386/125 |
| 2005/0066117 | A1 * | 3/2005  | Ramsey ....................... 711/112 |
| 2005/0281544 | A1 * | 12/2005 | La ............................ 386/125 |
| 2006/0215533 | A1 * | 9/2006  | Tieke et al. ............. 369/275.1 |

FOREIGN PATENT DOCUMENTS

| JP | 2000-066890 | 3/2000 |
| JP | 2001-103415 | 4/2001 |
| JP | 2003-168265 | 6/2003 |

\* cited by examiner

*Primary Examiner*—Wei Y Zhen
*Assistant Examiner*—Yuntao Guo
(74) *Attorney, Agent, or Firm*—Jerald L. Meyer; Jonathan A. Kidney; Jiaxiao Zhang

(57) ABSTRACT

A once-recordable optical disk has a data recorded area in which application software for creating an information group and a first file system are prerecorded. The application software is readable with the first file system and is used to select desired ones from among information pieces stored in a personal computer and form the information group. According to instructions from the application software, a second file system and the information group readable with the second file system are written in a blank area of the optical disk. After the creation of the information group, the application software and first file system in the optical disk are disabled so that they are unreadable with the second file system.

4 Claims, 15 Drawing Sheets

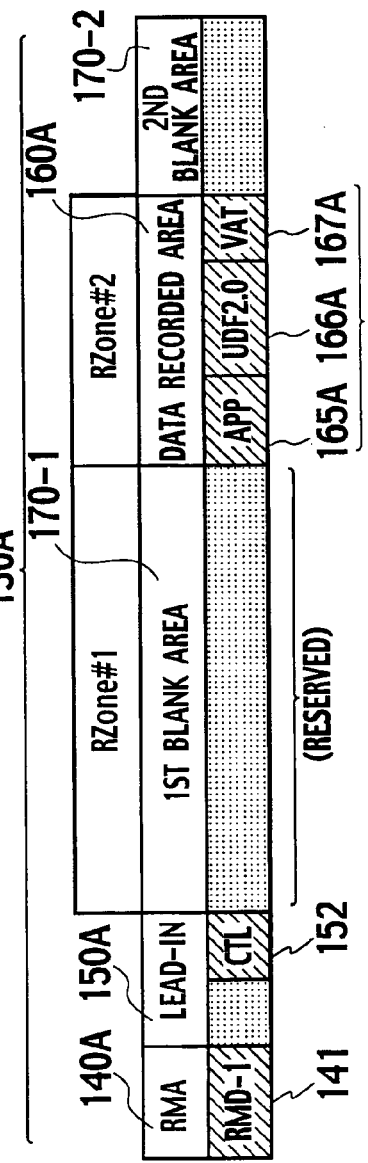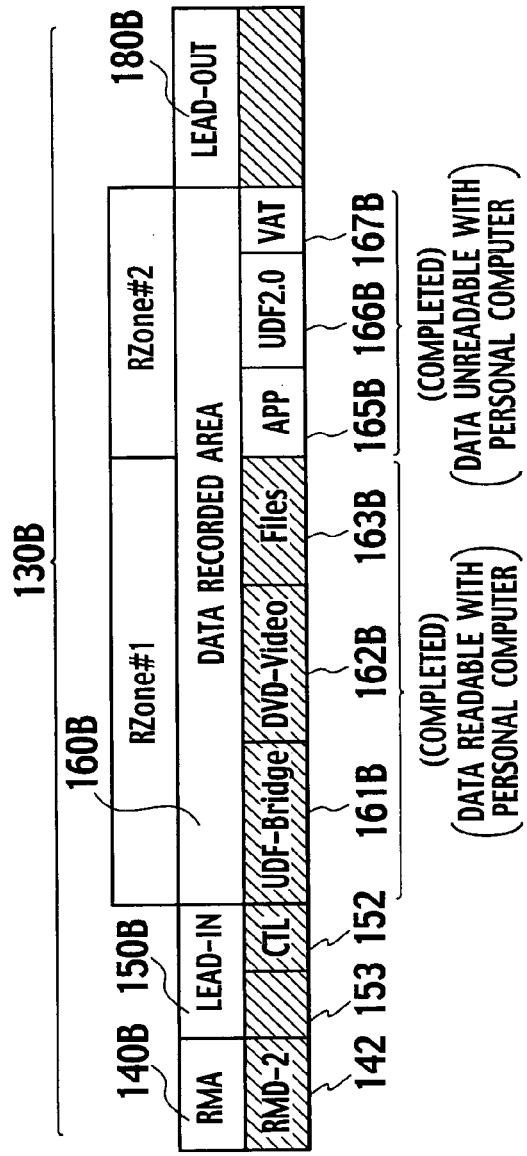

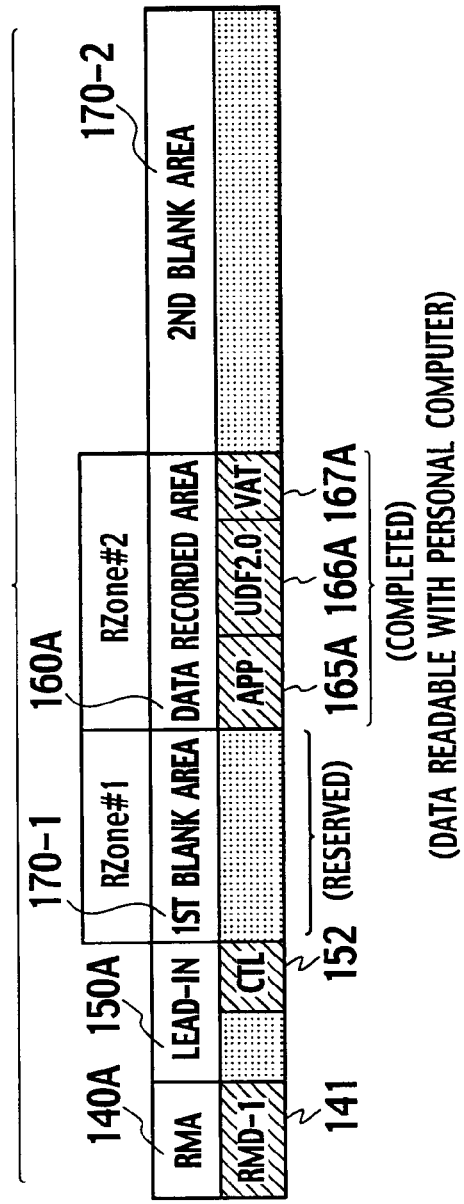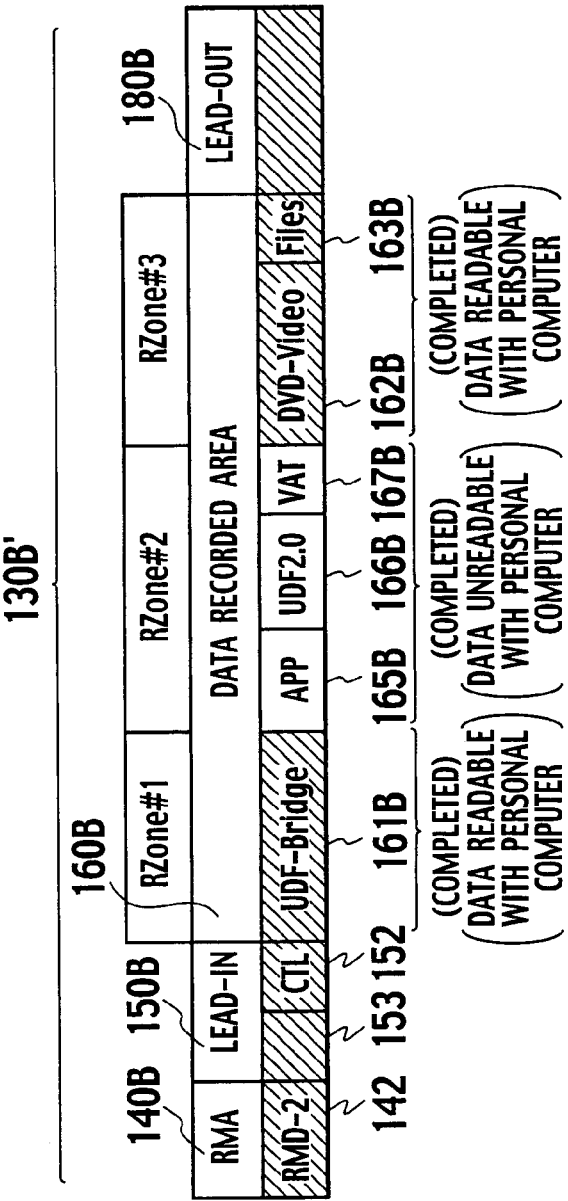
FIG. 8A
FIG. 8B

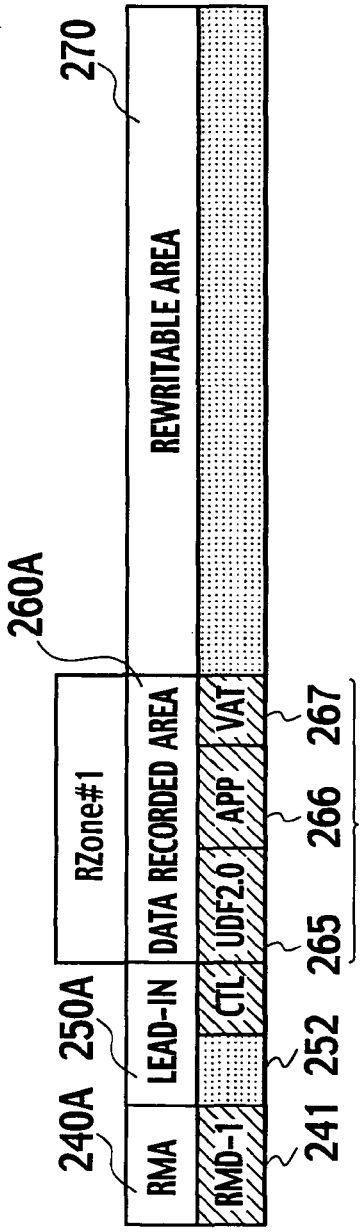
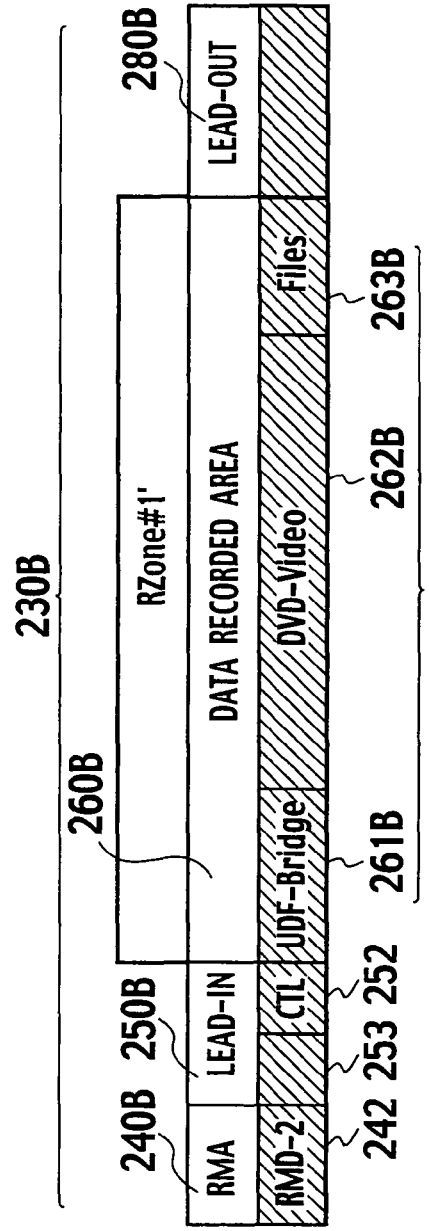
FIG. 14A
FIG. 14B

INFORMATION RECORDING METHOD AND OPTICAL DISK

BACKGROUND OF THE INVENTION

1. Field of the Invention

The present invention relates to an information recording method that only once installs information editing/recording application software from an optical disk into an information processor such as a personal computer, selects desired ones from among information pieces such as image and music pieces stored in the personal computer, edits the selected information pieces in desired order, writes the edited information pieces in a blank area and/or a rewritable area of the optical disk according to a predetermined optical-disk-standard format, makes the application software in the optical disk unreadable, and enables the optical disk with the written information to be played with an existing optical disk player. The present invention also relates to an optical disk to which the information recording method is applied.

2. Description of Related Art

Recently, digital cameras are widely used. The user may store images photographed with the digital camera in a hard disk of a personal computer. From among the stored images, the user may select desired ones and edit them in desired order for a slide show with the use of slide-show-editing application software stored in, for example, a CD-ROM (compact disc read only memory) or a DVD-ROM (digital versatile disk read only memory). Appropriate for such a purpose is a slide-show apparatus disclosed in Japanese Unexamined Patent Application Publication No. 2001-103415.

The slide-show apparatus (not shown) of this disclosure allows a user to edit image files stored in a CD-ROM with a slide-show executing program (slide-show-editing application software) stored in the CD-ROM. This slide-show executing program is also usable to select images taken by a digital camera and stored in a personal computer and edit the selected images in desired order for a slide show.

If the slide-show images selected and edited in the personal computer are written in a recordable-playable optical disk and if the optical disk is playable with a marketed optical disk (DVD or CD) player, one can see the slide-show images at home on a television monitor connected to the optical disk player. Naturally, the images may be viewed on a personal computer. The optical disk containing the slide-show images may be sent to a remote location.

There are several kinds of recordable-playable optical disks in the market. Among them, once-recordable optical disks include CD-R (CD recordable) disks and DVD-R (DVD recordable) disks and rewritable optical disks include CD-RW (CD rewritable) disks, DVD-RW (DVD rewritable) disks, and DVD-RAM (DVD random access memory) disks.

Generally, an optical disk such as a CD-ROM or a DVD-ROM provided with a slide-show executing program or information editing/recording application software is expensive without regard to the frequency of use of the program by a user because of the high development cost of the program. Due to this, the program, which may be used only a few times a year, is poorly sold.

To sell an optical disk containing information editing/recording application software at a low price, the application software may have a limited number of times of use so that a user may repeatedly purchase the same. If such a marketing concept is established, a developer of the application software can sell many pieces of the software to recover the development cost, and users can purchase the same at a low price although the use of the software is limited to a certain number of times. Then, both the developer and user have benefits.

In connection with this, there is a recording medium containing an activation limited program (refer to, for example, Japanese Unexamined Patent Application Publication No. 2000-66890). The activation limited program basically allows a user who holds a given user code to only once install the program from the medium into a single computer. If the computer has history of installation of the program, the computer will be allowed to install the program a limited number of times.

The technical idea of the activation limited program disclosed in the Japanese Unexamined Patent Application Publication No. 2000-66890 may be used to beforehand record a slide-show executing program (slide-show-editing application software) in a recordable-playable optical disk. From the optical disk, the slide-show executing program may be only once installed in a personal computer to edit images for a slide show from photographs taken with a digital camera. The disclosure, however, suggests nothing about recording slide-show images edited with a personal computer in a recordable-playable optical disk according to an optical-disk-standard format such as a DVD-Video-standard format or a Video-CD-standard format.

When using a personal computer to record images for a slide show in a recordable-playable optical disk according to the DVD-standard format or CD-standard format, the user must first edit images in the personal computer. To edit images, format conversion into, for example, MPEG must be carried out. To edit music, format conversion into, for example, LPCM must be carried out. To carry out the conversion, the user must have special knowledge. General users scarcely have such special knowledge.

SUMMARY OF THE INVENTION

An object of the present invention is to provide an information recording method that only once installs information editing/recording application software from an optical disk into an information processor such as a personal computer, selects desired ones from among information pieces such as image and music pieces stored in the personal computer, edits the selected information pieces in desired order, writes the edited information pieces in a blank area and/or a rewritable area of the optical disk according to a predetermined optical-disk-standard format, makes the application software in the optical disk unreadable, and enables the optical disk with the written information to be played with an existing optical disk player. Another object of the present invention is to provide an optical disk to which the information recording method is applied.

In order to accomplish the objects, a first aspect of the present invention provides an information recording method comprising installing application software that is for creating an information group and is readable with a first file system into an information processor from a data recorded area of a once-recordable optical disk where the application software and first file system are prerecorded; creating the information group by carrying out predetermined processes with the application software in the information processor; and according to instructions from the application software, writing a second file system conforming to a predetermined optical-disk-standard format and the created information group readable with the second file system into a blank area of the optical disk and making the application software and first file system in the data recorded area of the optical disk unreadable with the second file system.

According to the first aspect, the application software for creating an information group and the first file system are prerecorded in a data recorded area of a once-recordable optical disk. The application software is readable with the first file system and is used in an information processor (personal computer) to create an information group. According to instructions from the application software, the information processor writes the second file system conforming to a predetermined optical-disk-standard format and the created information group readable with the second file system in a blank area of the optical disk and disables the application software and first file system in the data recorded area of the optical disk so that they are unreadable with the second file system. As a result, the application software becomes only once installable in the information processor, and a developer of the application software can sell many pieces of the application software to recover the development cost thereof. At the same time, the user of the application software can purchase the application software at a low price although the user is allowed to install the software only once. Consequently, both the developer and user have benefits. The optical disk in which the information group has been recorded with the application software is playable with an existing optical disk player.

A second aspect of the present invention provides an information recording method comprising installing application software that is for creating an information group and is readable with a first file system into an information processor from a data recorded area of a rewritable optical disk where the application software and first file system are prerecorded; creating the information group by carrying out predetermined processes with the application software in the information processor; and according to instructions from the application software, writing a second file system conforming to a predetermined optical-disk-standard format over the data recorded area of the optical disk to thereby partly or entirely delete the first file system and application software in the data recorded area and writing the created information group readable with the second file system in a rewritable area of the optical disk.

According to the second aspect, the application software for creating an information group and the first file system are prerecorded in a data recorded area of a rewritable optical disk. The application software is readable with the first file system and is used in an information processor (personal computer) to create an information group. According to instructions from the application software, the information processor writes the second file system conforming to a predetermined optical-disk-standard format over the data recorded area of the optical disk, thereby partly or entirely deleting the first file system and application software in the data recorded area. Thereafter, the information processor writes the created information group readable with the second file system in a rewritable area of the optical disk. As a result, the application software becomes only once installable in the information processor, to provide the same effect as the first aspect. Writing the second file system over the data recorded area of the optical disk in which the first file system and application software are stored results in effectively using the data recorded area.

According to an embodiment of the present invention, the first file system is a UDF-2.0 file system and the second file system is a UDF-Bridge file system.

According to this embodiment, the UDF-Bridge file system serving as the second file system is based on a DVD standard format, and therefore, the information group written in the optical disk is playable with an existing DVD player.

A third aspect of the present invention provides an information recording method comprising installing application software that is for creating an information group and is readable with a file system conforming to a predetermined optical-disk-standard format into an information processor from a data recorded area of a rewritable optical disk where the application software and file system are prerecorded; creating the information group by carrying out predetermined processes with the application software in the information processor; and according to instructions from the application software, modifying data in the file system upon the creation of the information group, writing the modified file system over the data recorded area of the optical disk to thereby partly or entirely delete the file system and application software in the data recorded area, and writing the created information group readable with the modified file system in a rewritable area of the optical disk.

According to the third aspect, a rewritable optical disk has a data recorded area in which the file system conforming to a predetermined optical-disk-standard format and the application software for creating an information group are prerecorded. In an information processor, the application software readable with the file system is used to create an information group. According to instructions from the application software, the information processor modifies data in the file system upon the creation of the information group, writes the modified file system over the data recorded area of the optical disk to thereby partly or entirely delete the file system and application software in the data recorded area, and writes the created information group readable with the modified file system in a rewritable area of the optical disk. As a result, the application software becomes only once installable in the information processor, to provide the same effect as the first aspect. Writing, after the creation of an information group, the modified file system over the data recorded area of the optical disk in which the unmodified file system and application software are stored results in effectively using the data recorded area. Since the third aspect employs only one file system, the file system of the third aspect is simple.

According to an embodiment of the present invention, the file system is a UDF-Bridge file system.

According to this embodiment, the UDF-Bridge file system serving as the file system is based on a DVD-standard format, and therefore, an information group written according to the embodiment into an optical disk is playable with an existing DVD player.

According to an embodiment of the present invention, disk physical data and/or disk manufacturer data is prerecorded in the optical disk and data corresponding to the prerecorded data is retrieved from the application software installed in the information processor.

This embodiment retrieves data corresponding to the disk physical data and/or disk manufacturer data prerecorded in the optical disk from the application software installed in the information processor, to prevent an unauthorized use of the application software installed in the information processor.

A fourth aspect of the present invention provides an optical disk comprising a once-recordable data recorded area in which application software for creating an information group and a first file system for reading the application software are prerecorded. The application software has functions of being read in an information processor with the first file system, carrying out predetermined processes to create the information group, writing a second file system conforming to a predetermined optical-disk-standard format and the created information group readable with the second file system into a blank area of the optical disk, and making the application software and first file system stored in the data recorded area of the optical disk unreadable with the second file system.

According to the fourth aspect, the application software readable with the first file system is used in an information processor to select an information group from among a plurality of information pieces stored in the information processor and edit the information group in desired order. Thereafter, the second file system conforming to a predetermined optical-disk-standard format and the edited information group readable with the second file system are written in a blank area of the optical disk, and the application software and first file system in the optical disk are disabled so that they are unreadable with the second file system. As a result, the application software becomes only once installable in the information processor, and a developer of the application software can sell many pieces of the application software to recover the development cost thereof. At the same time, the user of the application software can purchase the application software at a low price although the user is allowed to install the software only once. Consequently, both the developer and user have benefits. The optical disk in which the information group has been written with the application software is playable with an existing optical disk player.

A fifth aspect of the present invention provides an optical disk comprising a rewritable data recorded area in which application software for creating an information group and a first file system for reading the application software are prerecorded. The application software has functions of being read in an information processor with the first file system, carrying out predetermined processes to create the information group, writing a second file system conforming to a predetermined optical-disk-standard format over the data recorded area of the optical disk to thereby partly or entirely delete the first file system and application software in the data recorded area, and writing the created information group readable with the second file system in a rewritable area of the optical disk.

According to the fifth aspect, the application software readable with the first file system is used in an information processor to select an information group from among a plurality of information pieces stored in the information processor and edit the information group in desired order. Thereafter, the second file system conforming to a predetermined optical-disk-standard format is written over the data recorded area of the optical disk, thereby partly or entirely deleting the first file system and application software in the data recorded area. Then, the created information group readable with the second file system is written in a rewritable area of the optical disk. As a result, the application software becomes only once installable in the information processor, to provide the same effect as the fourth aspect. Writing the second file system over the data recorded area of the optical disk in which the first file system and application software are stored results in effectively using the data recorded area.

A sixth aspect of the present invention provides an optical disk comprising a rewritable data recorded area in which a file system conforming to a predetermined optical-disk-standard format and application software that is readable with the file system and is used to create an information group are prerecorded. The application software has functions of being read in an information processor with the file system, carrying out predetermined processes to create the information group, modifying data in the file system upon the creation of the information group, writing the modified file system over the data recorded area of the optical disk to thereby partly or entirely delete the file system and application software in the data recorded area, and writing the created information group readable with the modified file system in a rewritable area of the optical disk.

According to the sixth aspect, the application software readable with the file system is used in an information processor to select an information group from among a plurality of information pieces stored in the information processor and edit the information group in desired order. Upon the creation of the information group, data in the file system is modified. The modified file system is written over the data recorded area of the optical disk, thereby partly or entirely deleting the unmodified file system and application software in the data recorded area. The created information group readable with the modified file system is written in a rewritable area of the optical disk. As a result, the application software becomes only once installable in the information processor, to provide the same effect as the fourth aspect. Writing the modified file system over the data recorded area of the optical disk in which the unmodified file system and application software are stored results in effectively using the data recorded area. Since the sixth aspect employs only one file system, the file system of the sixth aspect is simple.

The nature, principle and utility of the invention will become more apparent from the following detailed description when read in conjunction with the accompanying drawings.

BRIEF DESCRIPTION OF THE DRAWINGS

In the accompanying drawings:

FIGS. 6A and 6B are plan views showing an optical disk according to the first embodiment of the present invention in which FIG. 6A shows the optical disk before processed with a personal computer and FIG. 6B shows the optical disk after processed with a personal computer;

FIGS. 7A and 7B are models showing a signal area of the optical disk according to the first embodiment in which FIG. 7A shows the signal area before processed with a personal computer and FIG. 7B shows the signal area after processed with a personal computer;

FIGS. 8A and 8B are models showing a signal area of an optical disk according to a modification of the first embodiment of the present invention in which FIG. 8A shows the signal area before processed with a personal computer and FIG. 8B shows the signal area after processed with a personal computer;

FIGS. 13A and 13B are plan views showing an optical disk according to the second embodiment of the present invention in which FIG. 13A shows the optical disk before processed with a personal computer and FIG. 13B shows the optical disk after processed with a personal computer;

FIGS. 14A and 14B are models showing a signal area of the optical disk according to the second embodiment in which FIG. 14A shows the signal area before processed with a personal computer and FIG. 14B shows the signal area after processed with a personal computer;

FIGS. 15A and 15B are models showing a signal area of an optical disk according to a modification of the second embodiment of the present invention in which FIG. 15A shows the signal area before processed with a personal computer and FIG. 15B shows the signal area after processed with a personal computer.

DETAILED DESCRIPTION OF EMBODIMENTS

Information recording methods and optical disks according to the first and second embodiments will be explained in detail with reference to FIGS. 1 to 16.

The first embodiment will be explained in connection with a once-recordable optical disk and the second embodiment in connection with a rewritable optical disk.

First Embodiment

Figure 1:
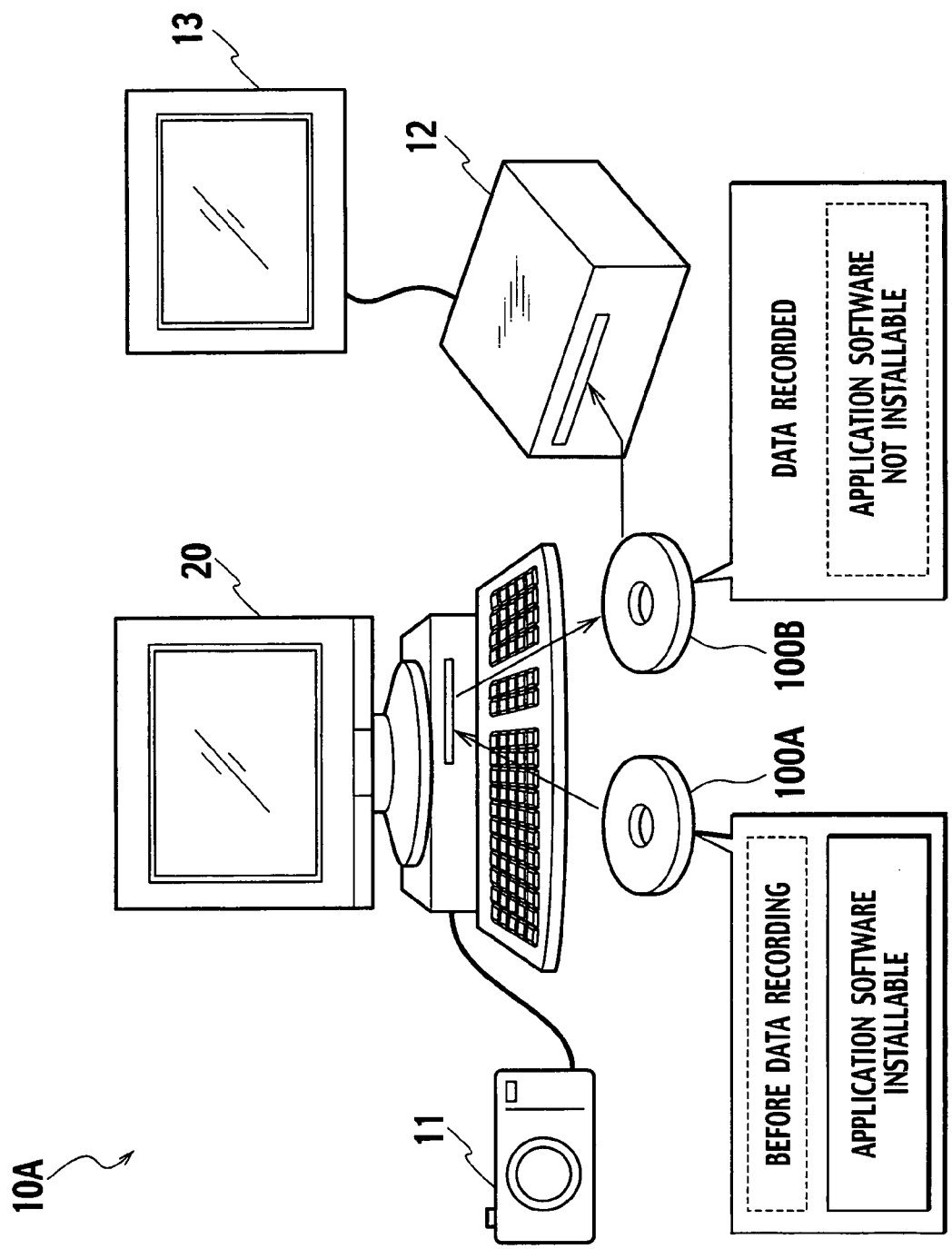
FIG. 1 is a perspective view showing an information recording system with which an information recording method and optical disk according to a first embodiment of the present invention are achievable.
Figure 2:
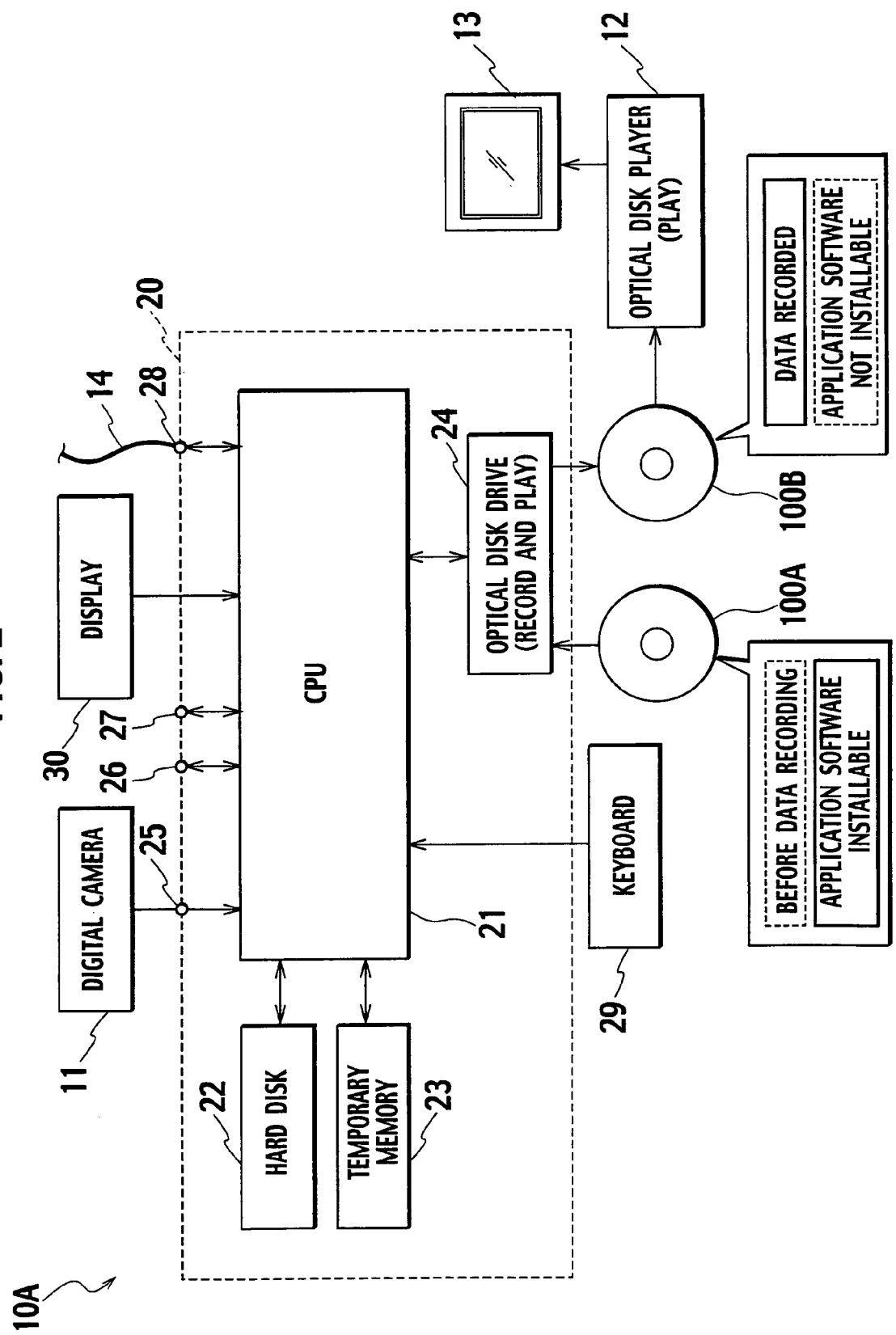
FIG. 2 is a block diagram showing the information recording system of FIG. 1.
Figure 3:
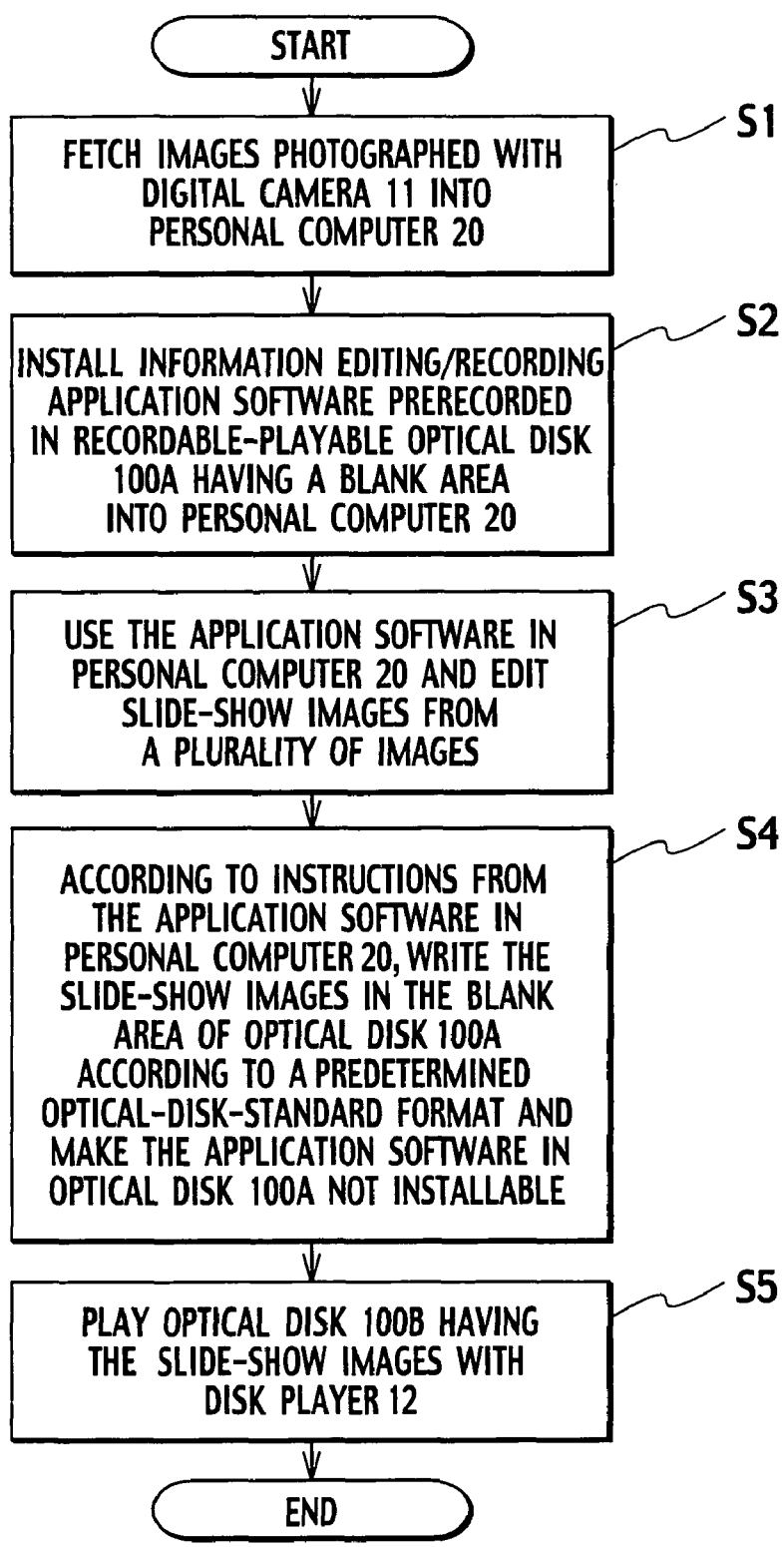
FIG. 3 is a flowchart showing the information recording method according to the first embodiment.

FIG. 1 is a perspective view showing an information recording system with which the information recording method and optical disk according to the first embodiment of the present invention are achieved. FIG. 2 is a block diagram showing the information recording system of FIG. 1, and FIG. 3 is a flowchart showing the information recording method according to the first embodiment.

In FIGS. 1 and 2, the information recording system 10A is employed with the information recording method and optical disk according to the first embodiment of the present invention. The optical disk 100A is recordable only once and has a data recorded area in which application software for creating an information group and a UDF-2.0 file system serving as a first file system are prerecorded. The application software is information editing/recording application software, is readable with the first file system, and is installed in a personal computer 20 serving as an information processor. A digital camera 11 is used to photograph images, which are stored in the personal computer 20. The application software is used to select desired ones from among the images stored in the personal computer 20, add back music and comments to the selected images if needed, and edit the selected images in desired order for a slide show, for example. According to instructions from the application software, a UDF-Bridge file system serving as a second file system conforming to a predetermined optical-disk-standard format and the slide-show images serving as an information group readable with the second file system are written in a blank area of the optical disk 10A. After the creation of the information group, the application software and first file system in the data recorded area of the optical disk 100A are disabled so that they are unreadable with the second file system, thereby providing an edited optical disk 100B.

After editing and writing the information group, the application software and first file system in the optical disk 100A are made to be unreadable with the second file system. This results in limiting the application software to be only once installable in the personal computer 20. The optical disk 100B with the slide-show images is playable with an existing optical disk player 12 so that one can see the slide-show images on a monitor TV 13 connected to the optical disk player 12.

The optical disk 100A may be a once-recordable DVD-R or CD-R disk. In the following explanation, the optical disk 100A is a DVD-R disk.

Before inserted into and processed with the personal computer 20, the optical disk 100A has a blank area where no data is written and the data recorded area where the application software, the first file system, and a virtual allocation table (VAT) are stored.

The playable optical disk 100B is prepared from the once-recordable optical disk 10A. Namely, the application software is used in the personal computer 20, to record, for example, slide-show images in the optical disk 100A according to a predetermined optical-disk-standard format. Thereafter, the application software in the optical disk 100A is disabled for installation, and the optical disk 100A is taken out as the optical disk 100B from the personal computer 20. In the optical disk 10B, the data recorded area where the application software and first file system are stored remains as it is.

According to the first embodiment, the application software prerecorded in the optical disk 100A is to edit, for example, an information group such as slide-show images and write the information group in the optical disk 10A. The application software is not limited to that for handling slide-show images. Any application software that processes information and writes the same in the optical disk 100A is employable for the present invention.

In FIG. 2, the personal computer 20 at least has a CPU 21 for generally controlling the personal computer, a hard disk 22 for storing a large amount of information such as image information and music information, a temporary memory 23 for temporarily storing various information pieces, an optical disk drive 24 for writing and reading an optical disk, USB ports 25 to 27, and an internet connection terminal 28. The personal computer 20 externally has a keyboard 29 for entering, for example, comments for images and a display 30 for displaying images and comments.

The hard disk 22 in the personal computer 20 may store, through the USB ports 25 to 27 and CPU 21, images taken with the digital camera 11, video data from a video appliance (not shown), and music data from an audio appliance (not shown). Also, the hard disk 22 may store various pieces of information from an internet line 14 through the internet connection terminal 28 and CPU 21.

The optical disk drive 24 in the personal computer 20 has an optical pickup (not shown) to write and read data to and from the optical disk 100A. According to the first embodiment, the optical disk 100A is a once-recordable DVD-R disk.

Operation of the information recording system 10A according to the first embodiment will be explained with reference to FIGS. 2 and 3. In step S1, images photographed with the digital camera 11 are stored in the hard disk 22 of the personal computer 20.

In step S2, the information editing/recording application software is installed in the personal computer 20. The application software is prerecorded in the optical disk 100A having a blank area and is readable with the UDF-2.0 file system, i.e., the first file system. More precisely, the optical disk drive 24 in the personal computer 20 reads the application software from the optical disk 100A with the first file system and stores the application software in the hard disk 22 via the CPU 21. The application software installed in the personal computer 20 is provided with unauthorized use preventing means. The details of this will be explained later.

Instead of storing the application software in the hard disk 22, it may be stored in the temporary memory 23. Alternatively, the application software may be distributed to the hard disk 22 and temporary memory 23. If the application software is stored in the hard disk 22, it will be deleted from the hard disk 22 once it is used. This prevents an unauthorized use of the application software. If the application software is stored in the temporary memory 23, it will be automatically deleted when the personal computer 20 is turned off, thereby preventing an illegal use of the application software.

In step S3, the application software is used in the personal computer 20, to select desired ones from among the images stored in the hard disk 22, add back music and comments to the selected images if needed, edit the selected images in desired order, formats the edited images so that they are readable with the UDF-Bridge file system, i.e., the second file system conforming to a predetermined optical-disk-standard format such as a DVD-Video standard format, provide the formatted images as, for example, an information group of slide-show images, and temporarily store the information group in the temporary memory 23 of the personal computer 20.

The application software may contain back music including bright tunes, quiet tunes, sporty tunes, and the like so that one can select back music from among the tunes and add the selected music to the slide-show images. Instead, music pieces may be stored in the hard disk 22 or may be picked up from the internet line 14 so that one can select back music from among the stored or picked-up music pieces and add the selected music to the slide-show images.

It is possible to add comments to the slide-show images. In this case, the user enters comments with the keyboard 29 of the personal computer 20 and adds the comments to the slide-show images on the display 30.

In step S4, the application software in the personal computer 20 issues an instruction to write the UDF-Bridge file system, i.e., the second file system in a blank area that follows a lead-in area of the optical disk 10A. After the second file system, the edited slide-show images are written in the blank area so that the written slide-show images are readable with the second file system. The application software and first file system recorded in the optical disk 100A are then disabled so that they are unreadable with the second file system. This completes the optical disk 100B containing the slide-show images. The optical disk 100B is taken out of the personal computer 20. The application software in the optical disk 100B is unable to install in the personal computer 20. Namely, the application software in the optical disk 100A is only once installable in the personal computer 20.

In step S5, the optical disk 100B with the slide-show images is played with an existing optical disk player, i.e., the DVD-Video player 12, to display the slide-show images on the monitor TV 13. Then, everyone can enjoy the slide-show images.

Although the operation shown in the flowchart of FIG. 3 relates to editing and writing slide-show images, the application software according to the present invention may create an information group of any kind and write it in the optical disk 10A.

The optical disk according to the first embodiment of the present invention will be explained with reference to FIGS. 4 to 8.

Figure 4:
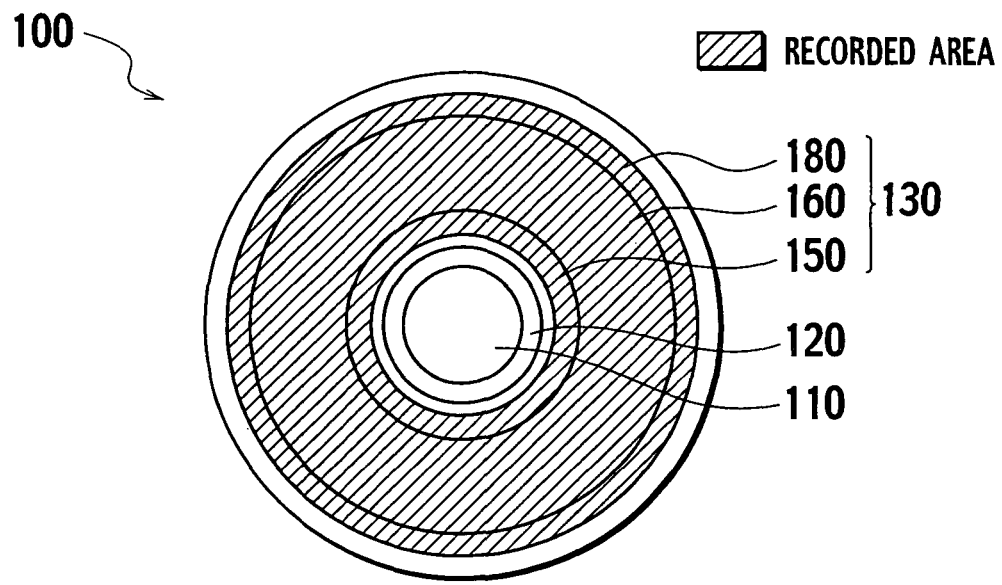
FIG. 4 is a plan view showing a DVD-Video disk available in the market.
Figure 5:
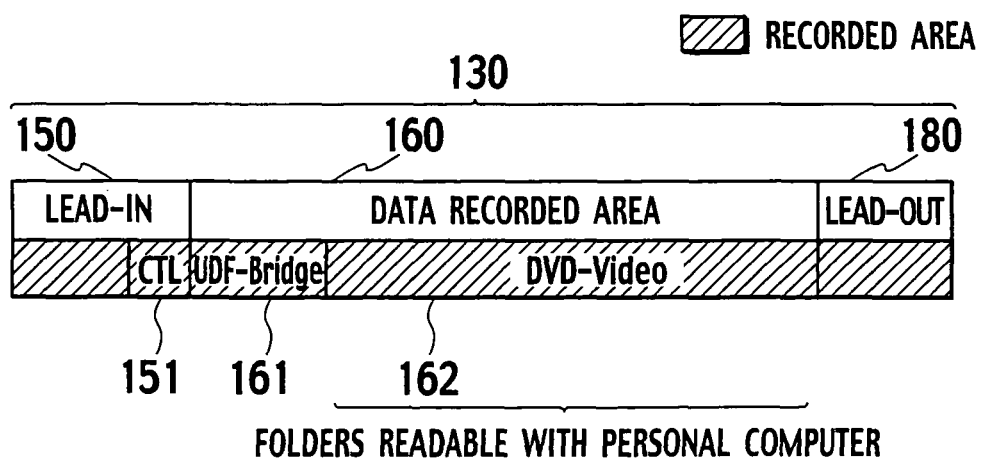
FIG. 5 is a view showing a DVD-Video format of the DVD-Video disk of FIG. 4.
Figure 6A:
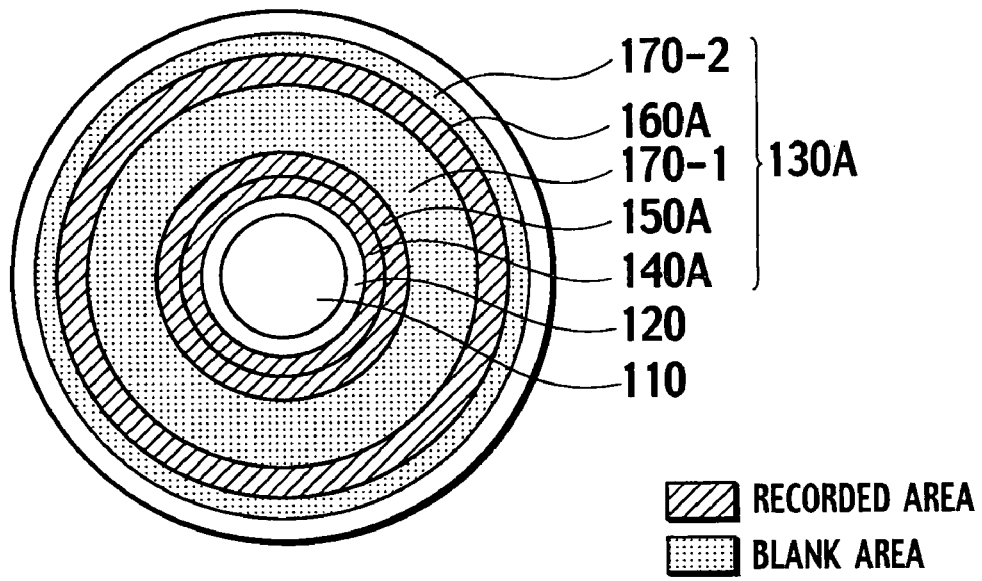
Figure 6B:
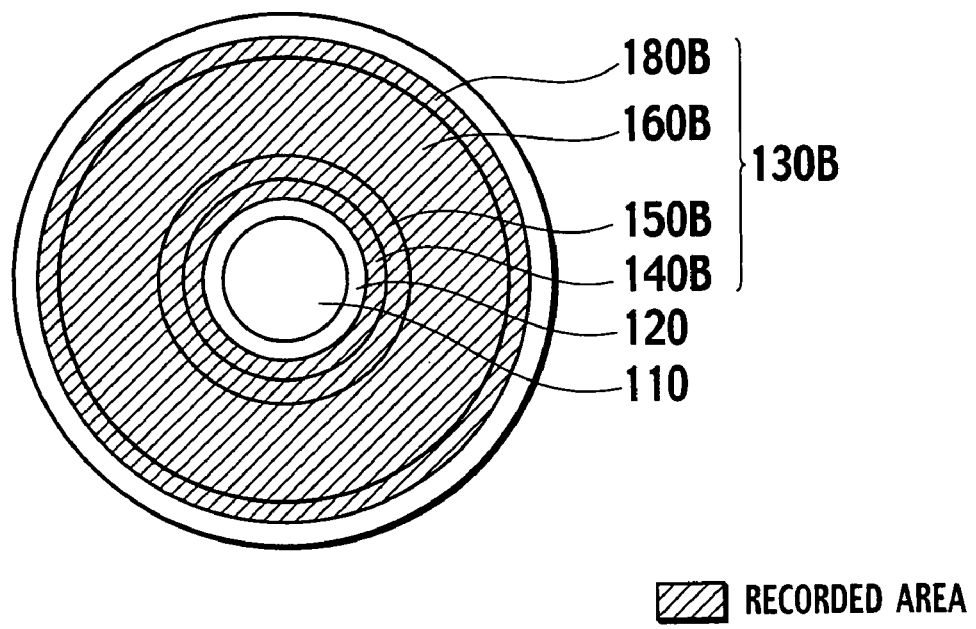

FIG. 4 is a plan view showing a DVD-Video disk available in the market, and FIG. 5 is a view showing a DVD-Video format of the DVD-Video disk of FIG. 4. FIG. 6A and 6B are plan views showing the optical disk according to the first embodiment of the present invention in which FIG. 6A shows the optical disk 100A before processed with the personal computer 20 and FIG. 6B shows the optical disk 100B after processed with the personal computer 20. FIG. 7A and 7B are models showing a signal area of the optical disk according to the first embodiment in which FIG. 7A shows a signal area 130A of the optical disk 100A before processed with the personal computer 20 and FIG. 7B shows a signal area 130B of the optical disk 100B after processed with the personal computer 20.

According to the first embodiment, the optical disk is a once-recordable DVD-R disk. Before explaining the optical disk of the first embodiment, a DVD-Video disk available in the market will be briefly explained with reference to FIGS. 4 and 5.

In FIG. 4, the read-only DVD-Video disk 100 available in the market has an outer diameter of 120 mm and a center through hole 110 having a diameter of 15 mm. Around the center hole 110, there is a clamp area 120. The center hole 110 is fitted to a center pole of a turntable (not shown) so that a bottom face of the clamp area 120 is placed on the turntable. A disk clamper (not shown) presses a top face of the clamp area 120 toward the turntable.

Around the clamp area 120, there is a read-only signal area 130 having a spiral track. From the inner circumference toward the outer circumference of the signal area 130, there are a lead-in area 150 indicating the start of the optical disk, a data recorded area 160 in which information such as image information and music information is written in a compressed form based on, for example, MPEG2, and a lead-out area 180 indicating the end of the optical disk.

In FIG. 5, the signal area 130 is based on the DVD-Video format. The lead-in area 150 includes prerecorded control data (CTL) 151 that contains information necessary for reproduction, such as the type, size, start sector, and end sector of the optical disk.

The data recorded area 160 includes a UDF-Bridge (universal disk format bridge) file system 161 for DVD-Video management and DVD-Video folders or directories 162 related to the file system 161.

The UDF-Bridge file system 161 is based on UDF (universal disk format) 1.02 standard and ISO 9660 standard. UDF 1.02 supports file systems of DVD-Video players and Windows 2000 and XP (registered trade names), and ISO 9660 supports file systems of Windows 95 and 98 (registered trade names). Data in the DVD-Video folders 162 is commonly read with any one of the file systems based on UDF 1.02 and ISO 9660.

The details of the DVD-Video folders 162 will not be explained. The DVD-Video folders 162 include a root directory containing VIDEO_TS, AUDIO_TS, user defined files, and the like.

The DVD-Video folders 162 can be read with a personal computer of standard setting through the UDF-Bridge file system 161.

The DVD-Video disk is correctly playable with the optical disk player 12 (FIGS. 1 and 2) based on DVD standards if files in the DVD-Video disk are managed under the UDF-Bridge file system 161 and have a single border structure.

The single border structure includes only one set of the lead-in area 150, data recorded area 160, and lead-out area 180 in the signal area 130 that extends from the inner circumference to the outer circumference of the DVD-standard optical disk. This structure is substantially equivalent to a single session structure of CD standards.

As explained above, the once-recordable optical disk 100A according to the first embodiment of the present invention contains the prerecorded information editing/recording application software. Installing the application software into the personal computer 20 (FIGS. 1 and 2) from the optical disk 100A is irrelevant to whether or not the optical disk 100A is based on the DVD-Video format. In the personal computer 20, the application software is used to select desired ones from among information pieces such as image and music pieces stored in the personal computer 20 and edit the selected information pieces. According to instructions from the application software, the edited information pieces are written in the optical disk 100A according to the DVD-Video format. The application software in the optical disk 100A is then disabled for installation, to provide the optical disk 100B that is based on the DVD-Video format.

Although the example explained here is based on the DVD-Video format, the present invention is also achievable on an optical disk such as a Video CD employing the ISO 9660 file system.

FIG. 6A shows the optical disk 100A according to the first embodiment of the present invention before inserted into and processed with the personal computer 20 (FIGS. 1 and 2). Like the DVD-Video disk 100 (FIG. 4) available in the market, the optical disk 100A has an outer diameter of 120 mm and a center through hole 110 of 15 mm in diameter. Around the center hole 110, there is a clamp area 120.

Around the clamp area 120, there is a signal area 130A having a spiral track. The structure of the signal area 130A of the optical disk 100A is different from the signal area 130 (FIGS. 4 and 5) of the DVD-Video disk 100. The signal area 130A is coated with an organic pigment recording film or a phase change recording film, and along the spiral track, there are RZones that are writable and readable according to an incremental writing mode of DVD-R standards. Unlike the signal area 130 (FIGS. 4 and 5) of the DVD-Video disk 100, the signal area 130A of the optical disk 100A has a recording management area (RMA) 140A on the inner side of the lead-in area 150A and has no lead-out area.

From the inner circumference to the outer circumference of the signal area 130A, there are the recording management area 140A, the lead-in area 150A, a first blank area 170-1, a data recorded area 160A containing application software, a UDF-2.0 file system serving as a first file system, and a virtual allocation table (VAT), and a second blank area 170-2. As mentioned above, the application software is information editing/recording application software. On the inner side of the recording management area 140A, there is a power calibration area (PCA) for optimizing write laser power. The power calibration area is irrelevant to the first embodiment, and therefore, is not shown.

Since the optical disk 100A has no lead-out area, it is not playable with the existing optical disk player (DVD player) 12 shown in FIGS. 1 and 2. The optical disk 100A, however, conforms to the incremental recording mode of DVD-R standards, and therefore, is recordable and playable with the optical disk drive 24 (FIG. 2) installed in the personal computer 20 (FIGS. 1 and 2).

FIG. 6B shows the optical disk 100B that is prepared by inserting the optical disk 100A into the personal computer 20 (FIGS. 1 and 2), recording an information group therein with the application software, and taking the optical disk 100A out of the personal computer 20. On the outer side of the clamp area 120 of the optical disk 100B, there is a signal area 130B consisting of a spiral track. The structure of the signal area 130B differs from that of the signal area 130A of the optical disk 100A. In the signal area 130B, a DVD-Video information group is written at a location corresponding to the first blank area 170-1 or second blank area 170-2 of the optical disk 100A. The application software in the optical disk 100A is disabled for installation in the optical disk 100B and is used as a data recorded area 160B in the optical disk 100B. The signal area 130B of the optical disk 100B also has a lead-in area 150B and a lead-out area 180B.

From the inner circumference to the outer circumference of the signal area 130B, there are a recording management area (RMA) 140B, the lead-in area 150B, the data recorded area 160B containing DVD-Video information group prepared with the application software and the application software disabled for installation, and the lead-out area 180B.

Namely, the optical disk 100B has a single border structure composed of one set of the lead-in area 150B, data recorded area 160B, and lead-out area 180B conforming to the DVD-Video standards. Accordingly, the optical disk 100B is correctly playable with the optical disk player 12 (FIGS. 1 and 2) based on the DVD-Video standards.

FIGS. 7A and 7B show a technical idea for recording the application software in the signal area 130A of the optical disk 100A so that the application software is installed in the personal computer 20 (FIGS. 1 and 2) and for disabling the application software in the signal area 130B of the optical disk 100B so that the application software is not installed in the personal computer 20.

FIG. 7A shows the signal area 130A of the optical disk 100A before inserted into and processed with the personal computer 20. From the inner circumference to the outer circumference of the optical disk 10A, there are the recording management area 140A, lead-in area 150A, first blank area 170-1, data-recorded area 160A, and second blank area 170-2.

The recording management area 140A is formed in the innermost circumferential part of the signal area 130A and is first read by an optical pickup (not shown) to start writing or reading. The recording management area 140A has fields 0 to 14 that separately store recording management data (RMD). If data is added to a reserved area, a zone type and the start and end sector numbers of an RZone are written in the field 4 of the recording management data.

The first blank area 170-1 is used as an RZone #1 whose recording state is "reserved." The data recorded area 160A is used as an RZone #2 whose recording state is "completed."

Before inserting the optical disk 100A into the personal computer 20, recording management data RMD-1 141 in the recording management area 140A contains the start and end addresses of the RZone #2 including the UDF-2.0 file system 166A. Accordingly, the optical pickup reads the recording management data-1 141, uses a pointer in the RZone #2, and moves to the start position of the UDF-2.0 file system 166A.

Adjacent to the recording management area 140A, there is the lead-in area 150A that contains control data (CTL) 152 representative of disk information. The control data 152 is in the form of pre-pits or is prerecorded. According to the first embodiment, disk physical data and/or disk manufacturer data contained in the control data 152 is used to prevent an unauthorized use of the application software 165A to be installed in the personal computer 20. The details of this will be explained later.

Around the lead-in area 150A, there is the first blank area 170-1 as the RZone #1. The RZone #1 is reserved so that a UDF-Bridge file system 161B serving as a second file system, DVD-Video folders 162B, and files 163B are written therein.

Around the first blank area 170-1, there is the data recorded area 160A as the RZone #2. Data is only once recordable in the data recorded area 160A, and the written data is undeletable. Accordingly, the written data remains at the written position.

The data recorded area 160A contains the application software 165A, UDF-2.0 file system 166A, i.e., the first file system, and virtual allocation table 167A. The RZone #2 consisting of the data recorded area 160A is completely recorded, and the data in the data recorded area 160A is readable from the personal computer.

The application software 165A recorded in the data recorded area 160A is information editing/recording application software and has an editing function. The editing function is used to select desired pieces of image and/or music information stored in the personal computer 20 and edit the selected information pieces, to provide an information group. If the edited information group is for a slide show, the editing function is used to select back music from among music pieces prepared in advance and add the selected back music to the information group. If required, the editing function is used to add comments to the information group. The editing function is also used to format the information group according to the UDF-Bridge file system 161B serving as the second file system conforming to a DVD-Video standard format. The application software 165A also has a writing function. The writing function is used to write the UDF-Bridge file system 161B in the first blank area 170-1 that follows the lead-in area 150A. After the UDF-Bridge file system 161B, the writing function writes the formatted information group as DVD-Video folders 162B and files 163B so that they are readable. The application software 165A also has a disabling function to make the application software 165B (=165A), the UDF-2.0 file system 166B (=166A), and the virtual allocation table 167B (=167A) unreadable. The application software 165A further has an unauthorized use preventing function that uses the disk physical data and/or disk manufacturer data in the control data 152 of the lead-in area 150A to carry out an unauthorized use preventing measure for the application software 165A installed in the personal computer 20.

The UDF-2.0 file system 166A in the data recorded area 160A includes a table of contents and retrieval information related to files of the application software 165A, such as the names, sizes, and locations of the files. When reaching the start of the UDF-2.0 file system 166A, the optical pickup (not shown) refers to the contents of the UDF-2.0 file system 166A and executes the application software 165A.

The virtual allocation table 167A in the data recorded area 160A virtually allocates the locations of folders to be written in the first blank area 170-1. The virtual allocation table 167A enables an information group to be edited and written under the single border structure of the first embodiment.

Around the data recorded area 160A, there is the second blank area 170-2. In the second blank area 170-2, the lead-out area 180B based on the DVD-Video standard format is written.

When the optical disk 100A is inserted into the personal computer 20, the application software 165A is activated with the UDF-2.0 file system 166A, i.e., the first file system, so that the application software 165A may be used to edit an information group.

According to instructions from the application software 165A, the UDF-Bridge file system, DVD-Video folders, and files are written into the first blank area 170-1, i.e., the RZone #1 of the optical disk 10A, and the state of the RZone #1 is changed from "reserved" to "completed." At this time, the data recorded area 160A, i.e., the RZone #2 is kept as it is. The optical disk 100A as a whole is subjected to a finalizing process to form a single border structure, thereby completing the optical disk 100B of FIG. 7B.

Writing the RZone #1 will be explained in more detail. In the first blank area 170-1 of the optical disk 10A, the UDF-Bridge file system 161B, i.e., the second file system, DVD-Video folders 162B, and files 163B such as image and music files are written in the DVD standard format. The state of the first blank area 170-1 is changed from "reserved" to "completed" to thereby form the data recorded area 160B of the optical disk 100B.

The UDF-Bridge file system 161B, DVD-Video folders 162B, and data files 163B are made to be readable with a personal computer.

The RZone #2 of the optical disk 100B holds the data recorded area 160A of the optical disk 10A. As a result, the data recorded area 160B of the edited optical disk 100B contains the application software 165B, UDF-2.0 file system 166B, and virtual allocation table (VAT) 167B. However, the application software 165B, UDF-2.0 file system 166B, and virtual allocation table 167B in the RZone #2 are not registered to the UDF-Bridge file system 161B, and therefore, are unreadable with a personal computer.

In the finalizing process, additional data of a predetermined format is written in a blank area of the lead-in area 150A of the optical disk 10A, to form additional data 153 in the lead-in area 150B of the optical disk 100B. Also, predetermined lead-out information is written in the second blank area 170-2 of the optical disk 10A, to form the lead-out area 180B of the optical disk 100B.

When the optical disk 100B is taken out of the personal computer 20, the signal area 130B of the optical disk 100B includes, from the inner circumference to the outer circumference thereof, the recording management area 140B, lead-in area 150B, data recorded area 160B, and lead-out area 180B.

The recording management area 140B is located along the innermost circumference of the signal area 130B. The recording management area 140B is first read with an optical pickup (not shown). In the recording management area 140B, the recording management data RMD-1 141 explained with reference to FIG. 7A has been updated to recording management data RMD-2 142 shown in FIG. 7B. The recording management data RMD-2 142 contains the start and end addresses of the RZone #1 including the UDF-Bridge file system 161B. Accordingly, the optical pickup reads the recording management data RMD-2 142, uses a pointer in the RZone #1, and moves to a start position of the UDF-Bridge file system 161B.

Adjacent to the recording management area 140B, there is the lead-in area 150B. In the lead-in area 150B, the control data 152 explained with reference to FIG. 7A is written in the form of pre-pits or is prerecorded, to be used for preventing an unauthorized use. The lead-in area 150B also contains the additional data 153 in a predetermined format.

Adjacent to the lead-in area 150B, there is the data recorded area 160B. From the inner circumferential side to the outer circumferential side of the data recorded area 160B, there are the UDF-Bridge file system 161B that follows the lead-in area 150B, the DVD-Video folders 162B, the files 163B of, for example, image and music information, the application software 165B, the UDF-2.0 file system 166B, and the virtual allocation table 167B. The blocks 161B to 163B in the RZone #1 are in the "completed" state and are readable with a personal computer. On the other hand, the blocks 165B to 167B in the RZone #2 are in the "completed" state and are unreadable with a personal computer.

Namely, the data recorded area 160B includes the RZone #1 and RZone #2 in which only the RZone #1 is readable with the personal computer 20.

The UDF-Bridge file system 161B refers to the DVD-Video folders 162B and files 163B but does not refer to the UDF-2.0 file system 166B and virtual allocation table 167B.

In this way, the optical disk 100B is finalized to have the single border structure conforming to the DVD-Video standards. Accordingly, the optical disk 100B is playable with a marketed DVD-Video player. The application software 165B recorded in the RZone #2 of the data recorded area 160B of the optical disk 100B is unable to read with the UDF-Bridge file system 161B. Consequently, the application software 165B is usable only once. Namely, the application software 165B is unable to install from the optical disk 100B into a personal computer.

The DVD-Video folders 162B adjacent to the UDF-Bridge file system 161B are prepared with the use of the application software 165A shown in FIG. 7A. Namely, images photographed with the digital camera 11 are stored in the personal computer 20. The application software 165A is used to select desired ones of the stored images, add back music or comments to the selected images, edit the images in desired order, and provide an information group of, for example, slide-show images. The information group is compressed according to a DVD standard format with the use of a compression technique such as MPEG2. The compressed data is stored in the DVD-Video folders 162B and is played with the existing optical disk player (DVD player) 12 shown in FIGS. 1 and 2.

The files 163B adjacent to the DVD-Video folders 162B hold the slide-show images in, for example, a JPEG format, to eliminate a need of storing the slide-show images in the personal computer 20. Although the files 163B are not playable with the existing optical disk player (DVD player) 12 shown in FIGS. 1 and 2, they are viewable by inserting the optical disk 100B into the personal computer 20.

As explained above, changing the first file system, i.e., the UDF-2.0 file system 166A (166B) into the second file system, i.e., the UDF-Bridge file system 161B results in making the application software 165A not to be installable in the personal computer 20 with the UDF-Bridge file system 161B. This provides an editing/writing system that allows the application software to be installed only once.

According to the first embodiment, a developer of the application software 165A can sell many pieces of the application software 165A to recover the development cost thereof. Although the user of the application software 165A can use the application software 165A only once, the user can purchase the optical disk 100A containing the application software 165A at a low price. Consequently, both the developer and user have benefits.

A modification of the first embodiment of the present invention will be explained with reference to FIGS. 8A and 8B.

FIGS. 8A and 8B are models showing a signal area of an optical disk according to the modification of the first embodiment in which FIG. 8A shows a signal area 130A' of an optical disk 100A' before inserted into or processed with the personal computer 20 and FIG. 8B shows a signal area 130B' of an optical disk 100B' after processed with and removed from the personal computer 20.

In FIG. 8A, the signal area 130A' of the optical disk 10A' before inserted into the personal computer 20 has the same block structure as that of the signal area 130A of the optical disk 100A explained with reference to FIG. 7A. Namely, from the inner circumference toward the outer circumference of the signal area 130A', there are a recording management area (RMA) 140A, a lead-in area 150A, a first blank area 170-1 in an RZone #1, a data recorded area 160A in an RZone #2, and a second blank area 170-2. However, the lengths of the first and second blank areas 170-1 and 170-2 in a recording direction differ from those of the optical disk 100A.

In FIG. 8B, the signal area 130B' of the optical disk 100B' after processed with and removed from the personal computer 20 differs from the signal area 130B of the optical disk 100B explained with reference to FIG. 7B in a sequence of sections in the data recorded area 160B. From the inner circumference toward the outer circumference of the data recorded area 160B, there are a UDF-Bridge file system 161B in an RZone #1, application software 165B, a UDF-2.0 file system 166B, and a virtual allocation table (VAT) 167B in an RZone #2, DVD-Video folders 162B and files 163B in an RZone #3, and a lead-out area 180B of a predetermined format.

The first blank area 170-1 of the optical disk 100A' is reserved, and the UDF-Bridge file system 161B is written therein, to form the RZone #1 of the optical disk 100B'. The UDF-Bridge file system 161B follows the lead-in area 150B. Accordingly, the RZone #1 of the optical disk 10A' or 100B' is narrower than the RZone #1 of the optical disk 100A or 100B shown in FIGS. 7A and 7B.

The DVD-Video folders 162B and files 163B are edited and written in the second blank area 170-2 according to the sizes of editing objects, to form the RZone #3 of the data recorded area 160B. Accordingly, the RZone #3 can be quickly formed in the optical disk 100B'.

According to the modification of the first embodiment, the application software 165B, UDF-2.0 file system 166B, and virtual allocation table 167B in the signal area 130B' of the optical disk 100B' are unreadable with the UDF-Bridge file system 161B.

A technical idea for preventing an unauthorized use of the application software 165A after installing the same in the personal computer 20 from the optical disk 100A of the first embodiment or from the optical disk 100A' of the modification of the first embodiment will be explained with reference to FIG. 9.

Figure 9:
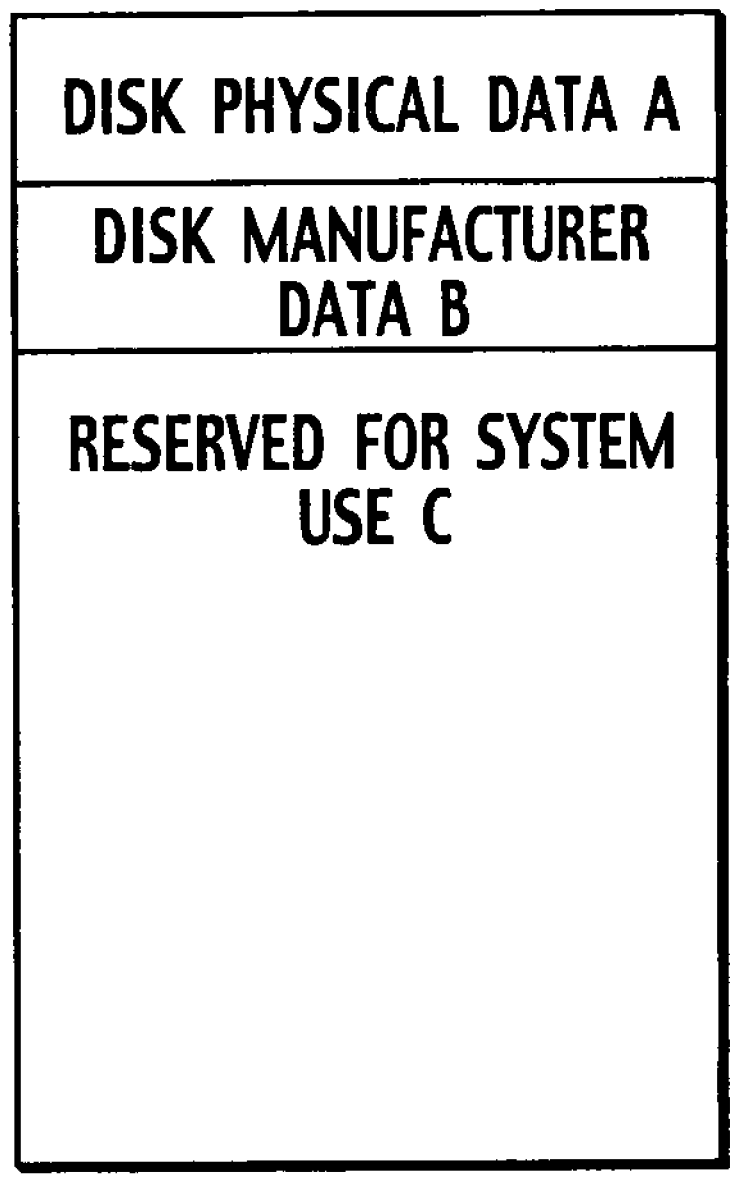
FIG. 9 is a view showing control data (CTL) prerecorded in a lead-in area of the optical disk according to the first embodiment or the modification thereof, the control data being used for preventing an unauthorized use of application software installed in a personal computer.

FIG. 9 is a view explaining the control data (CTL) 152 prerecorded in the lead-in area of the optical disk according to the first embodiment or the modification thereof. The control data 152 is used to prevent an unauthorized use of the application software installed in a personal computer.

In FIG. 9, the control data 152 in the lead-in area 150A includes disk physical data A, disk manufacturer data B, a system reserved section C, and the like. These data pieces are in the form of pre-pits or are prerecorded in the optical disk 100A to be shipped. The user can read the control data 152 with a DVD player or a DVD recorder-player but is unable to alter the control data 152 with the DVD recorder-player.

According to the first embodiment, only a manufacturer is allowed to change at least one of the disk physical data A and disk manufacturer data B in connection with the application software 165A stored in the optical disk 100A of FIG. 7A.

For example, the manufacturer may change the end position of a spiral track of the optical disk shorter than a normal end sector address and writes the end position in the disk physical data A of the control data 152 of the optical disk. Then, no user can alter the disk physical data A, and the shortened end sector address disagrees with the end sector address of any optical disk available in the market. This improves the security of the application software 165A.

The disk manufacturer data B of the control data 152 may contain a code that is decodable with the application software 165A. The code is used for ensuring the security of the application software 165A.

Information corresponding to the disk physical data A and/or disk manufacturer data B contained in the control data 152 may be prerecorded in the application software 165A. After installing the application software 165A in a personal computer, the corresponding information may be read from the installed application software 165A and compared with the data stored in the optical disk 100A, to prevent an unauthorized use of the application software 165A.

Alternatively, tracks in the optical disk 100A are wobbled, and unauthorized use preventing data is superimposed on wobbling signals or on land pre-pits formed between the wobbled tracks. The wobbled tracks and land pre-pits are formed during the manufacturing of the optical disk, and therefore, are never altered with a DVD recorder-player.

There will be two ways a user conducts unauthorized use of the optical disk according to the first embodiment of the present invention.

One is copying the unused optical disk 100A with its structure to a blank optical disk. The other is installing the optical disk 100A in a personal computer, removing the optical disk 100A from a recorder-player during the editing of DVD-Video data, and inserting a blank disk into the recorder-player.

Preventing the former is achieved by confirming, at the start of execution of the application software 165A, whether or not values in the application software 165A are relevant to or agree with values in the control data 152 of the optical disk 100A.

Preventing the latter is achieved by conducting the above-mentioned confirmation process at the start of or in the middle of DVD-Video recording. The confirmation process may be carried out at various points of timing.

Second Embodiment

Figure 10:
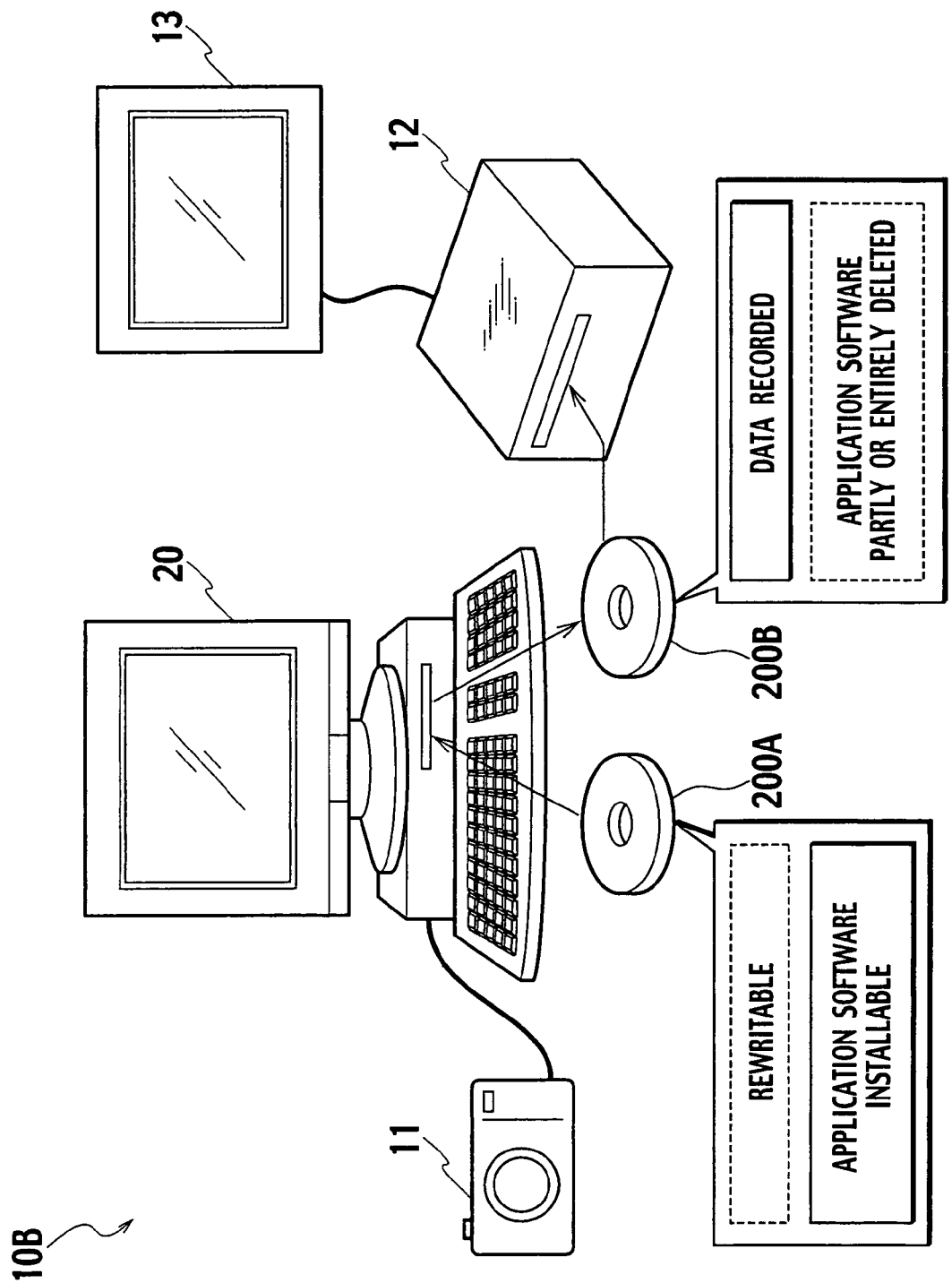
FIG. 10 is a perspective view showing an information recording system with which an information recording method and optical disk according to a second embodiment of the present invention are achievable.
Figure 11:
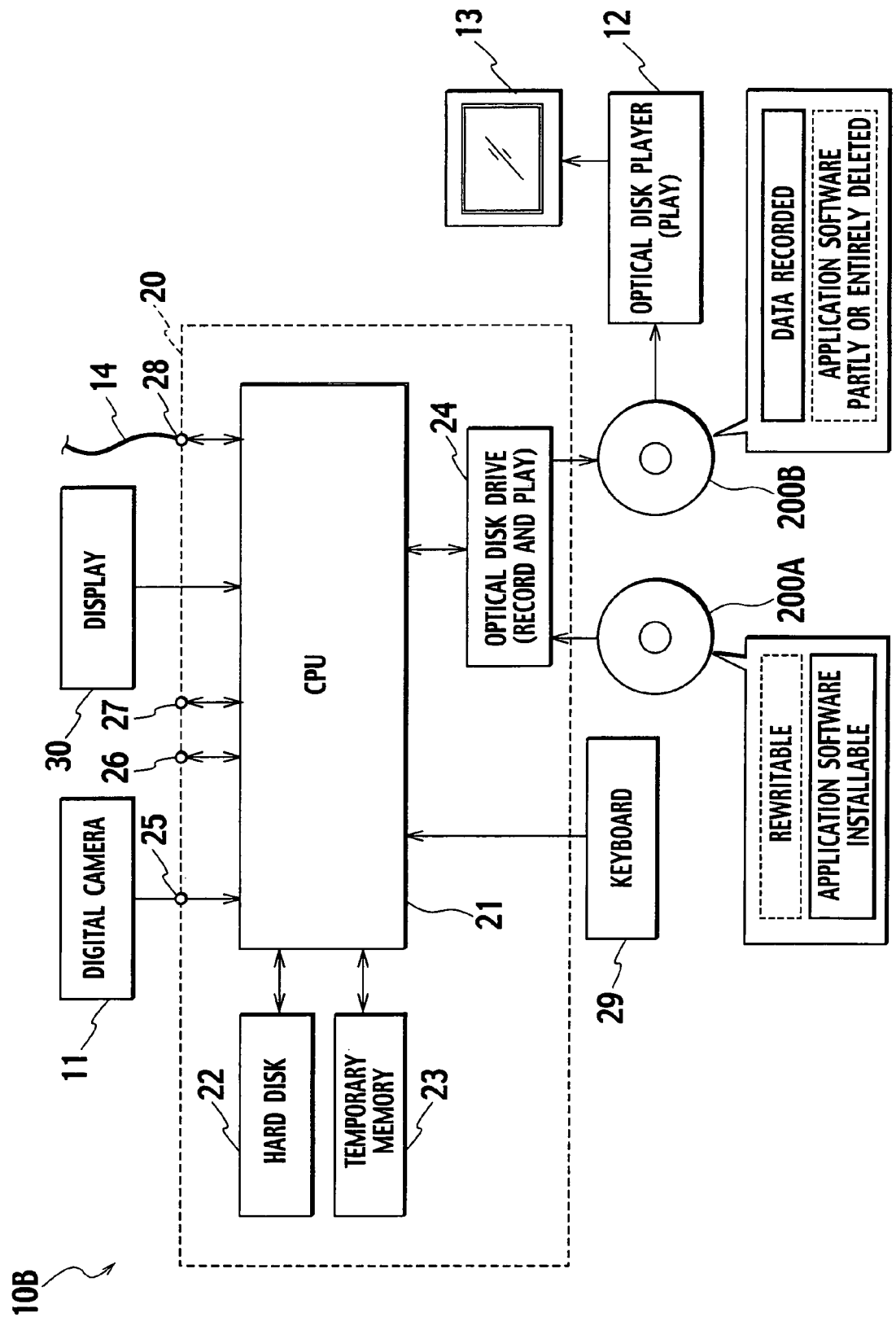
FIG. 11 is a block diagram showing the information recording system of FIG. 10.
Figure 12:
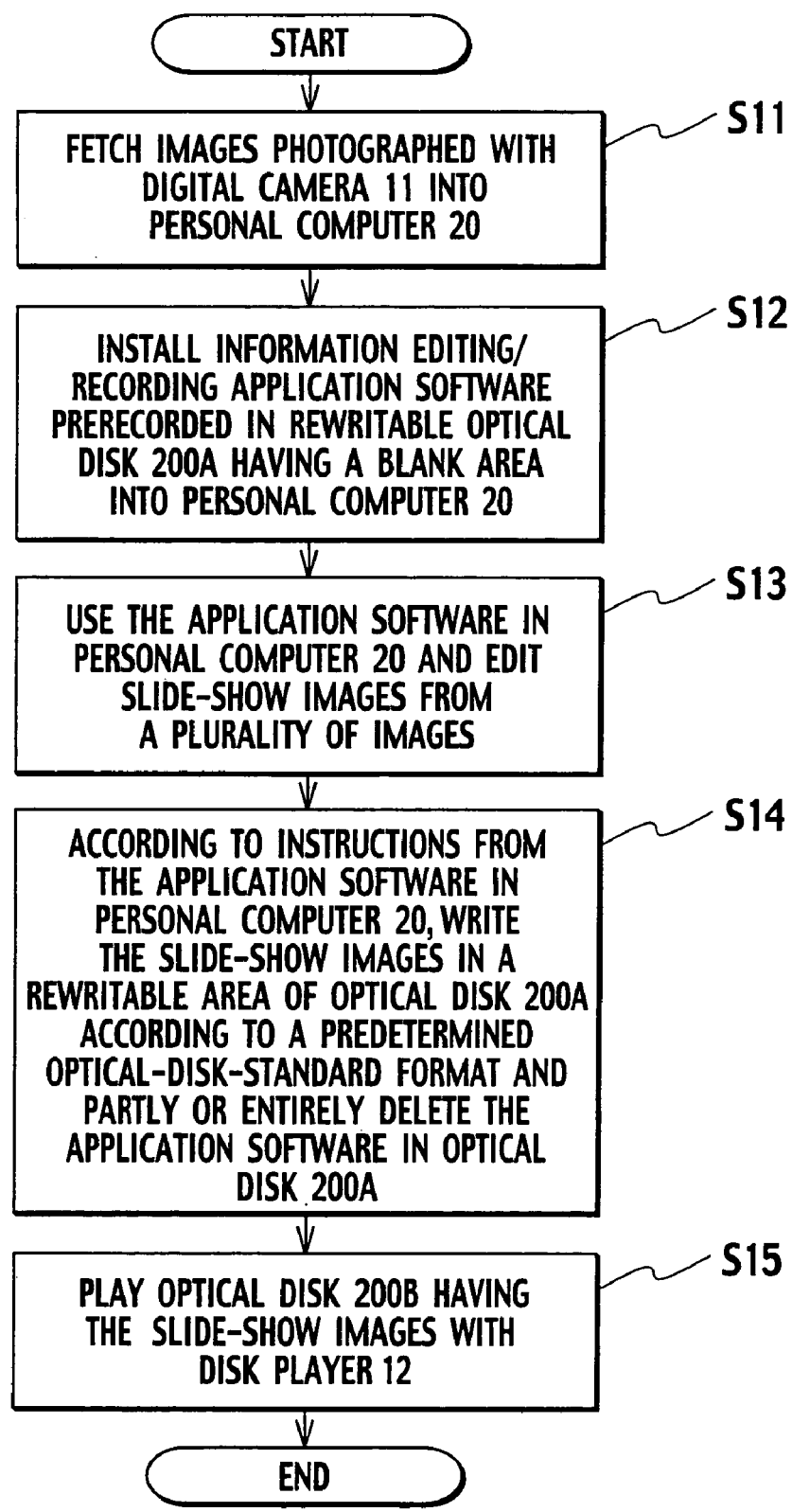
FIG. 12 is a flowchart showing the information recording method according to the second embodiment.

FIG. 10 is a perspective view showing an information recording system with which an information recording method and optical disk according to the second embodiment of the present invention are achieved. FIG. 11 is a block diagram showing the information recording system of FIG. 10 and FIG. 12 is a flowchart showing the information recording method according to the second embodiment.

The information recording system 10B shown in FIGS. 10 and 11 differs from the information recording system 10A of the first embodiment in an optical disk type. Namely, the second embodiment uses a rewritable optical disk 200A, and therefore, the information recording method according to the second embodiment partly differs from the first embodiment. In the following explanation, the same parts as those of the first embodiment are represented with the same reference marks and different parts from those of the first embodiment are represented with new reference marks. These different parts will be mainly explained.

In FIGS. 10 and 11, the information recording system 10B employs the rewritable optical disk 200A. The rewritable optical disk 200A has a data recorded area that holds a UDF-2.0 file system serving as a first file system and application software for creating an information group. The application software, is information editing/recording application software, is readable with the first file system, and is installed in an information processor, i.e., a personal computer 20. For example, a digital camera 11 is used to photograph images, which are stored in the personal computer 20. The application software is used to select desired ones from among the stored images, add back music and comments to the selected images if needed, and edit the selected images in desired order for a slide show, for example. According to instructions from the application software, a UDF-Bridge file system serving as a second file system conforming to a predetermined optical-disk-standard format is written over the data recorded area of the optical disk 200A after the creation of the slide-show images, to thereby partly or entirely delete the first file system and application software in the optical disk 200A. At the same time, the information group, i.e., the slide-show images readable with the second file system are written in a rewritable area of the optical disk 200A, thus providing an edited optical disk 200B.

In the optical disk 200B, the first file system and application software are partly or entirely deleted. This means that the application software in the optical disk 200A is only once installable in the personal computer 20. The optical disk 200B with the slide-show images is playable with an existing optical disk player 12 so that one can see the slide-show images on a monitor TV 13 connected to the optical disk player 12.

The rewritable optical disk 200A may be a DVD-RW disk, a CD-RW disk, or a DVD-RAM disk. In this embodiment, the optical disk 200A is a DVD-RW disk.

Before inserted into and processed with the personal computer 20, the optical disk 200A has the rewritable area into which data is repeatedly writable and the data recorded area where the application software, the first file system, and a virtual allocation table (VAT) are prerecorded.

The playable optical disk 200B is prepared from the rewritable optical disk 200A. Namely, the application software is used in the personal computer 20, to record an information group, for example, slide-show images in the optical disk 200A according to a predetermined optical-disk-standard format. Thereafter, the application software in the optical disk 200A is partly or entirely deleted, and the optical disk 200A is taken out as the optical disk 200B from the personal computer 20. The application software in the optical disk 200B is unreadable.

According to the second embodiment, the application software prerecorded in the recordable-playable optical disk 200A is to edit an information group, for example, slide-show images and write the information group in the optical disk 200A. The application software is not limited to that for handling slide-show images. Any application software that processes information and writes the same in the optical disk 200A is applicable to the present invention.

In FIG. 11, the personal computer 20 at least has a CPU 21 for generally controlling the personal computer, a hard disk 22 for storing a large amount of information such as image information and music information, a temporary memory 23 for temporarily storing various information pieces, an optical disk drive 24 for writing and reading an optical disk, USB ports 25 to 27, and an internet connection terminal 28. The personal computer 20 externally has a keyboard 29 for entering, for example, comments for images and a display 30 for displaying images and comments.

Operation of the information recording system 10B according to the second embodiment will be explained with reference to FIGS. 11 and 12. In step S11, images photographed with the digital camera 11 are stored in the hard disk 22 of the personal computer 20.

In step S12, the information editing/recording application software is installed in the personal computer 20. The application software is prerecorded in the recordable-playable optical disk 200A having a rewritable area and is readable with the UDF-2.0 file system, i.e., the first file system. More precisely, the optical disk drive 24 in the personal computer 20 reads the application software from the optical disk 200A with the first file system and stores the application software in the hard disk 22 via the CPU 21. The application software installed in the personal computer 20 is provided with unauthorized use preventing means. The details of this will be explained later.

Instead of storing the application software in the hard disk 22, it may be stored in the temporary memory 23. Alternatively, the application software may be distributed to the hard disk 22 and temporary memory 23. If the application software is stored in the hard disk 22, it will be deleted from the hard disk 22 once it is used. This prevents an unauthorized use of the application software. If the application software is stored in the temporary memory 23, it will be automatically deleted when the personal computer 20 is turned off, thereby preventing an illegal use of the application software.

In step S13, the application software is used in the personal computer 20, to select desired ones from among the images stored in the hard disk 22, add back music and comments to the selected images if needed, edit the selected images in desired order, format the edited images so that they are readable with the UDF-Bridge file system, i.e., the second file system conforming to a predetermined optical-disk-standard format such as a DVD-Video standard format, provide the formatted images as, for example, an information group of slide-show images, and temporarily store the information group in the temporary memory 23 of the personal computer 20.

The application software may contain back music including bright tunes, quiet tunes, sporty tunes, and the like so that one can select back music from among the tunes and add the selected music to the slide-show images. Instead, music pieces may be stored in the hard disk 22 or may be picked up from the internet line 14 so that one can select back music from among the stored or picked-up music pieces and add the selected music to the slide-show images.

It is possible to add comments to the slide-show images. In this case, the user enters comments with the keyboard 29 of the personal computer 20 and adds the comments to the slide-show images on the display 30.

In step S14, the application software in the personal computer 20 issues an instruction to write the UDF-Bridge file system serving as the second file system over the data recorded area that follows a lead-in area in the optical disk 200A, to thereby partly or entirely delete the first file system and application software in the optical disk 200A. The edited slide-show images are written in the rewritable area that follows the second file system so that the written slide-show images are readable with the second file system. This completes the optical disk 200B containing the slide-show images. The optical disk 200B is taken out of the personal computer 20. In the optical disk 200B, the application software has been partly or entirely deleted. Namely, the application software in the optical disk 200A is only once installable in the personal computer 20.

In step S15, the optical disk 200B with the slide-show images is played with an existing optical disk player, i.e., the DVD-Video player 12, to display the slide-show images on the monitor TV 13. Then, everyone can enjoy the slide-show images.

Although the operation shown in the flowchart of FIG. 12 relates to editing and writing slide-show images, the application software according to the present invention can create an information group of any kind and write it in the optical disk 200A.

The optical disk according to the second embodiment of the present invention will be explained in detail with reference to FIGS. 13 and 14.

Figure 13A:
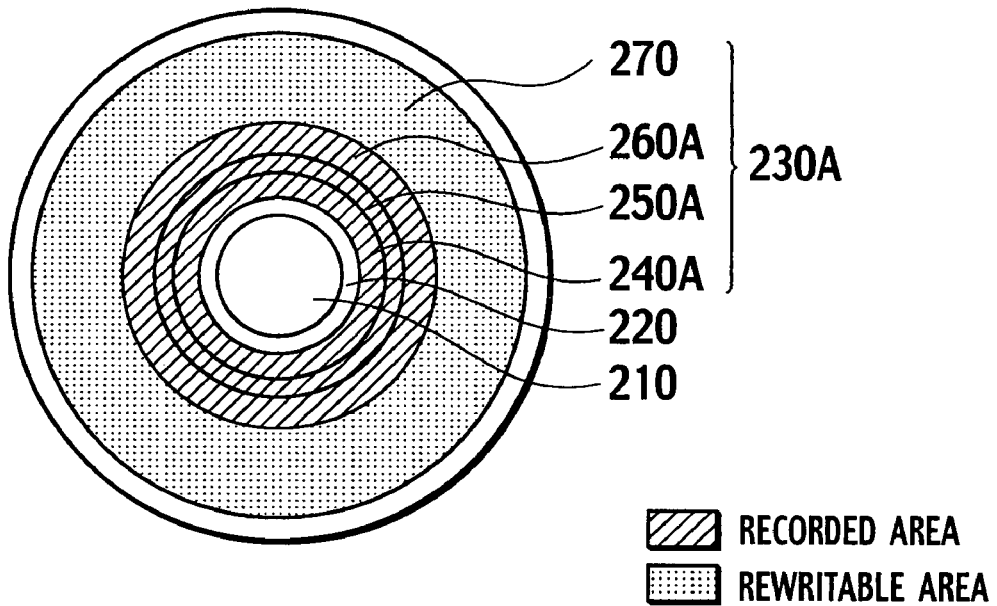
Figure 13B:
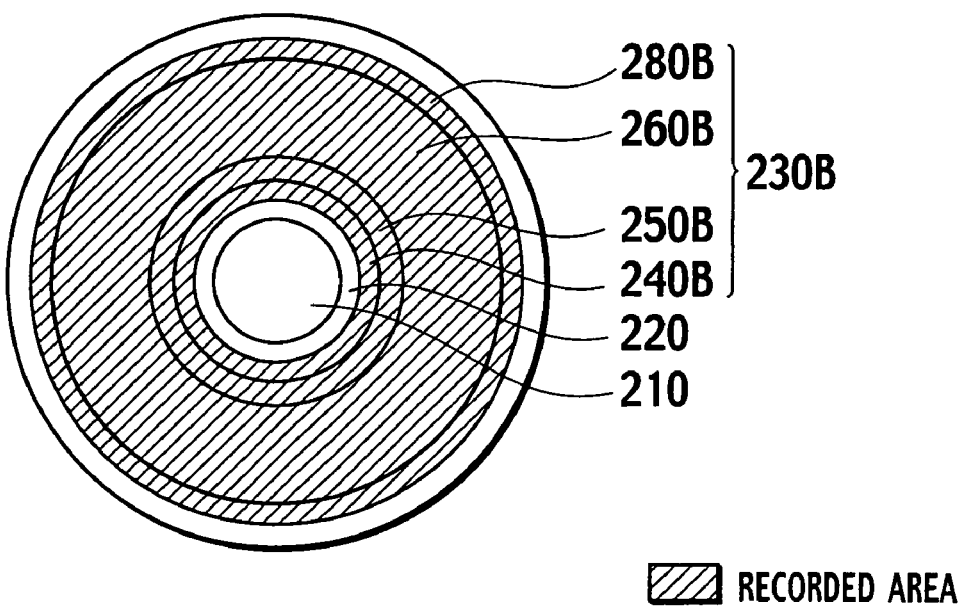

FIGS. 13A and 13B are plan views showing the optical disk according to the second embodiment in which FIG. 13A shows the optical disk 200A before inserted into or processed with the personal computer 20 and FIG. 13B shows the optical disk 200B after processed with and removed from the personal computer 20. FIGS. 14A and 14B are models explaining a signal area of the optical disk according to the second embodiment in which FIG. 14A shows a signal area 230A of the optical disk 200A before processed with the personal computer 20 and FIG. 14B shows a signal area 230B of the optical disk 200B after processed with and removed from the personal computer 20.

In FIG. 13A, the optical disk 200A is before inserted into and processed with the personal computer 20 (FIGS. 10 and 11). Like the DVD-Video disk 100 (FIG. 4) available in the market, the optical disk 200A has an outer diameter of 120 mm and a center through hole 210 of 15 mm in diameter. Around the center hole 210, there is a clamp area 220.

Around the clamp area 220, there is the signal area 230A having a spiral track. The structure of the signal area 230A of the optical disk 200A is different from the signal area 130 (FIGS. 4 and 5) of the DVD-Video disk 100. The signal area 230A is coated with a phase change recording film, and along the spiral track, there is an RZone that is recordable and playable according to an incremental writing mode of the DVD-RW disk standards. Unlike the signal area 130 (FIGS. 4 and 5) of the DVD-Video disk 100, the signal area 230A of the optical disk 200A has a recording management area (RMA) 240A on the inner side of the lead-in area 250A and has no lead-out area.

From the inner circumference to the outer circumference of the signal area 230A, there are the recording management area 240A, lead-in area 250A, data recorded area 260A containing the UDF-2.0 file system, i.e., the first file system, application software, and virtual allocation table, and a rewritable area 270. On the inner side of the recording management area 240A, there is a power calibration area (PCA) for optimizing write laser power. The power calibration area is irrelevant to the second embodiment, and therefore, is not shown. The data recorded area 260A of the optical disk 200A is a rewritable area on which data can be overwritten.

Since the optical disk 200A has no lead-out area, it is not playable with the existing optical disk player (DVD player) 12 shown in FIGS. 10 and 11. The optical disk 200A, however, conforms to the incremental writing mode of the DVD-R standards, and therefore, is recordable and playable with the optical disk drive 24 (FIG. 11) installed in the personal computer 20 (FIGS. 10 and 11).

FIG. 13B shows the optical disk 200B that is prepared by inserting the optical disk 200A into the personal computer 20 (FIGS. 10 and 11), recording an information group therein with the application software, and taking the optical disk 200A out of the personal computer 20. On the outer side of the clamp area 220 of the optical disk 200B, there is a signal area 230B consisting of a spiral track. The structure of the signal area 230B differs from that of the signal area 230A of the optical disk 200A. In the signal area 230B, the second file system, i.e., the UDF-Bridge file system is written over the data recorded area 230A of the optical disk 200A, to partly or entirely delete the first file system, i.e., the UDF-2.0 file system and application software. Also, the DVD-Video information group is written in the rewritable area 270 (260A) of the optical disk 200A, to form the data recorded area 260B of the optical disk 200B. Further, a lead-in area 250B and a lead-out area 280B are added.

From the inner circumference to the outer circumference of the signal area 230B, there are a recording management area (RMA) 240B, the lead-in area 250B, the data recorded area 260B containing the UDF-Bridge file system and the DVD-Video information group prepared with the application software, and the lead-out area 280B.

Namely, the optical disk 200B has a single border structure composed of one set of the lead-in area 250B, data recorded area 260B, and lead-out area 280B conforming to the DVD-Video standards. Accordingly, the optical disk 200B is correctly playable with the optical disk player 12 (FIGS. 10 and 11) based on the DVD-Video standards.

FIGS. 14A and 14B show a technical idea for recording the application software in the signal area 230A of the optical disk 200A so that the application software is installed in the personal computer 20 (FIGS. 10 and 11) and for disabling the application software in the signal area 230B of the optical disk 200B so that the application software is not installable in the personal computer 20.

FIG. 14A shows the signal area 230A of the optical disk 200A before inserted into and processed with the personal computer 20. From the inner circumference to the outer circumference of the optical disk 200A, there are the recording management area 240A, lead-in area 250A, data recorded area 260A, and rewritable area 270.

The recording management area 240A is formed in the innermost circumferential part of the signal area 230A and is first read by an optical pickup (not shown) to start writing or reading. The recording management area 240A has fields 0 to 14 that separately store recording management data (RMD). If data is added to a reserved area, a zone type and the start and end sector numbers of an RZone are written in the field 4 of the recording management data.

According to an RZone recording system of the optical disk 200A, the data recorded area 260A corresponds to an RZone #1.

Before inserting the optical disk 200A into the personal computer 20, recording management data RMD-1 241 in the recording management area 240A contains the start and end addresses of the RZone #1 including the UDF-2.0 file system 265. Accordingly, the optical pickup reads the recording management data RMD-1 241, uses a pointer in the RZone #1, and moves to the start of the UDF-2.0 file system 265.

Adjacent to the recording management area 240A, there is the lead-in area 250A that contains control data (CTL) 252 representative of disk information. The control data 252 is in the form of pre-pits or is prerecorded. According to the second embodiment, disk physical data and/or disk manufacturer data contained in the control data 252 is used to prevent an unauthorized use of the application software 266 to be installed in the personal computer 20. The details of this will be explained later.

Around the lead-in area 250A, there is the data recorded area 260A in the RZone #1. The RZone #1 contains the UDF-2.0 file system 265, i.e., the first file system, application software 266, and virtual allocation table 267. The RZone #1 consisting of the data recorded area 260A is completely recorded, and the data in the data recorded area 260A is readable with the personal computer 20. The data recorded area 260A is repeatedly writable, and therefore, the UDF-Bridge file system, i.e., the second file system in the data recorded area 260A may be overwritten. An information group prepared with the application software 266 is also written over the data recorded area 260A.

Around the data recorded area 260A, there is the rewritable area 270 in which an information group prepared with the application software 266 is repeatedly writable.

The UDF-2.0 file system 265 in the data recorded area 260A includes a table of contents and retrieval information related to files of the application software 266, such as the names, sizes, and locations of the files. When reaching the start position of the UDF-2.0 file system 265, the optical pickup (not shown) refers to the contents of the UDF-2.0 file system 265 and activates the application software 266.

The application software 266 recorded in the data recorded area 260A is information editing/recording application software and has an editing function. The editing function is used to select desired pieces of image and/or music information stored in the personal computer 20 and edit the selected information pieces, to provide an information group. If the edited information group is for a slide show, the editing function is used to select back music from among music pieces prepared in advance and add the selected back music to the information group. If required, the editing function is used to add comments to the information group. Then, the editing function is used to format the information group according to the UDF-Bridge file system 261B serving as the second file system conforming to the DVD-Video standard format. The application software 266 also has a burning (writing or recording) function. The burning function is used to write the UDF-Bridge file system 261B over the data recorded area 260A that follows the lead-in area 250A, to partly or entirely delete the first file system, i.e., the UDF-2.0 file system 265, application software 266, and virtual allocation table 267. After the UDF-Bridge file system 261B, the burning function writes the edited DVD-Video folders 262B and files 263B so that they are readable with the UDF-Bridge file system 261B. The application software 266 also has an unauthorized use preventing function that uses the disk physical data and/or disk manufacturer data in the control data 252 of the lead-in area 250A to carry out an unauthorized use preventing measure for the application software 266 installed in the personal computer 20.

The virtual allocation table 267 in the data recorded area 260A virtually allocates the locations of folders to be written in the rewritable area 270. The virtual allocation table 267 enables an information group to be edited and written under the single border structure of the second embodiment.

At the end of the rewritable area 270, the lead-out area 280B is written for the DVD-Video standard format.

When the optical disk 200A is inserted into the personal computer 20, the application software 266 is activated with the UDF-2.0 file system 265, i.e., the first file system, so that the application software 266 may be used to edit an information group.

According to instructions from the application software 266, the UDF-Bridge file system, DVD-Video folders, and files are written in the RZone #1 of the data recorded area 260A of the optical disk 200A, thereby changing the state of the RZone #1 to "completed." The optical disk 200A as a whole is subjected to a finalizing process to form the single border structure, thereby completing the optical disk 200B of FIG. 14B.

Overwriting the RZone #1 will be explained in more detail. The UDF-2.0 file system 265, application software 266, and virtual allocation table 267 recorded in the data recorded area 260A of the optical disk 200A are overwritten with the UDF-Bridge file system 261B, i.e., the second file system conforming to the DVD standard format, to partly or entirely delete the UDF-2.0 file system 265, application software 266, and virtual allocation table 267. Also, the rewritable area (260A) 270 is written with the DVD-Video folders 262B and files 263B of, for example, image and music. An area covering the UDF-Bridge file system 261B to the files 263B is set as an RZone #1' whose recorded state is set to "completed" to form the data recorded area 260B of the optical disk 200B.

At this time, the UDF-2.0 file system 265, application software 266, and virtual allocation table 267 are deleted from the RZone #1 of the data recorded area 260A in the optical disk 200A as shown in FIGS. 14A and 14B. Namely, the lead-in area 250B of the optical disk 200B is followed by the overwritten UDF-Bridge file system 261B and the information group recorded in the data-deleted rewritable area (260A) and rewritable area 270. This configuration does not limit the present invention. For example, only an essential part of the data recorded area 260A of the optical disk 200A may be deleted to make the application software 266 unreadable. In this case, the lead-in area 250B of the optical disk 200B must be followed by the overwritten UDF-Bridge file system 261B, and the information group is written in the remaining part of the area 260A and the rewritable area 270.

The UDF-Bridge file system 261B, DVD-Video-folders 262B, and information files 263B in the RZone #1' are made to be readable with a personal computer.

In the finalizing process, additional data of a predetermined format is written in a blank area of the lead-in area 250A of the optical disk 200A, to form additional data 253 in the lead-in area 250B of the optical disk 200B. Also, predetermined lead-out information is written at an end part of the rewritable area 270 of the optical disk 200A, to form the lead-out area 280B of the optical disk 200B.

When the optical disk 200B is taken out of the personal computer 20, the signal area 230B of the optical disk 200B includes, from the inner circumference to the outer circumference thereof, the recording management area 240B, lead-in area 250B, data recorded area 260B, and lead-out area 280B.

The recording management area 240B is located along the innermost circumference of the signal area 230B. The recording management area 240B is first read with an optical pickup (not shown). In the recording management area 240B, the recording management data RMD-1 241 explained with reference to FIG. 14A has been updated to the recording management data RMD-2 242 shown in FIG. 14B. The recording management data RMD-2 242 contains the start and end addresses of the RZone #1' containing the UDF-Bridge file system 261B. Accordingly, the optical pickup reads the recording management data RMD-2 242, uses a pointer in the RZone #1', and moves to a start position of the UDF-Bridge file system 261B.

Adjacent to the recording management area 240B, there is the lead-in area 250B. In the lead-in area 250B, the control data 252 explained with reference to FIG. 14A is written in the form of pre-pits or is prerecorded, to be used for preventing an unauthorized use. The lead-in area 250B also contains the additional data 253 in a predetermined format.

Adjacent to the lead-in area 250B, there is the data recorded area 260B. From the inner circumferential side to the outer circumferential side of the data recorded area 260B, there are the UDF-Bridge file system 261B that follows the lead-in area 250B, the DVD-Video folders 262B, and the files 263B of, for example, image and music information. The blocks 261B to 163B in the RZone #1' are in the "completed" state, and therefore, are readable with a personal computer.

In this way, the optical disk 200B is finalized into a single border structure, to provide an optical disk conforming to the DVD-Video standards. Accordingly, the optical disk 200B is playable with a marketed DVD-Video player. The application software 266 recorded in the RZone #1 of the data recorded area 260A of the optical disk 200A has been partly or entirely deleted. Consequently, the application software 266 is usable only once. Namely, the application software 266 is unable to install from the optical disk 200B into a personal computer.

The DVD-Video folders 262B adjacent to the UDF-Bridge file system 261B are prepared with the use of the application software 266 shown in FIG. 14A. Namely, images photographed with the digital camera 11 are stored in the personal computer 20. The application software 266 is used to select desired ones of the stored images, add back music or comments to the selected images, edit the images in desired order, and provide an information group of, for example, slide-show images. The information group is compressed according to a DVD standard format with the use of a compression technique such as MPEG2. The compressed data is written in the DVD-Video folders 262B and is played with the existing optical disk player (DVD player) 12 shown in FIGS. 10 and 11.

The files 263B adjacent to the DVD-Video folders 262B hold the slide-show images in, for example, a JPEG format, to eliminate a need of storing the slide-show images in the personal computer 20. Although the files 263B are not playable with the existing optical disk player (DVD player) 12 shown in FIGS. 10 and 11, they are viewable by inserting the optical disk 200B into the personal computer 20.

As explained above, writing the second file system, i.e., the UDF-Bridge file system 261B over the UDF-2.0 file system 265, application software 266, and virtual allocation table 267 recorded in the data recorded area 260A of the optical disk 200A results in allowing the application software 266 to be installed only once.

According to the second embodiment, a developer of the application software 266 can sell many pieces of the application software 266 with the optical disk 200A to recover the development cost thereof. Although the user of the application software 266 can use the application software 266 only once, the user can purchase the optical disk 200A containing the application software 266 at a low price. Consequently, both the developer and user have benefits. Writing the second file system over the first file system and application software in the data recorded area results in effectively using the data recorded area.

A modification of the second embodiment of the present invention will be explained with reference to FIGS. 15A and 15B.

Figure 15A:
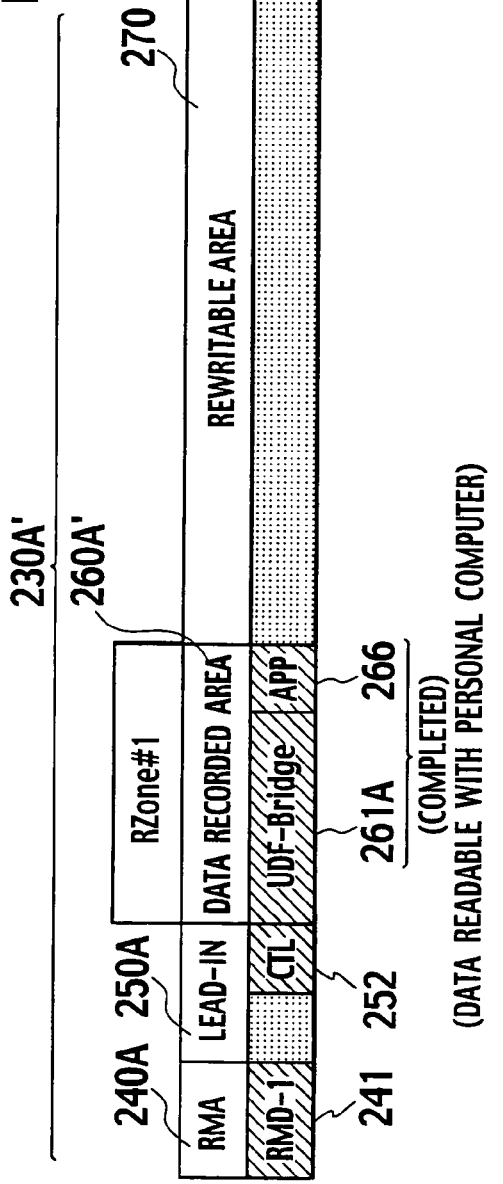
Figure 15B:
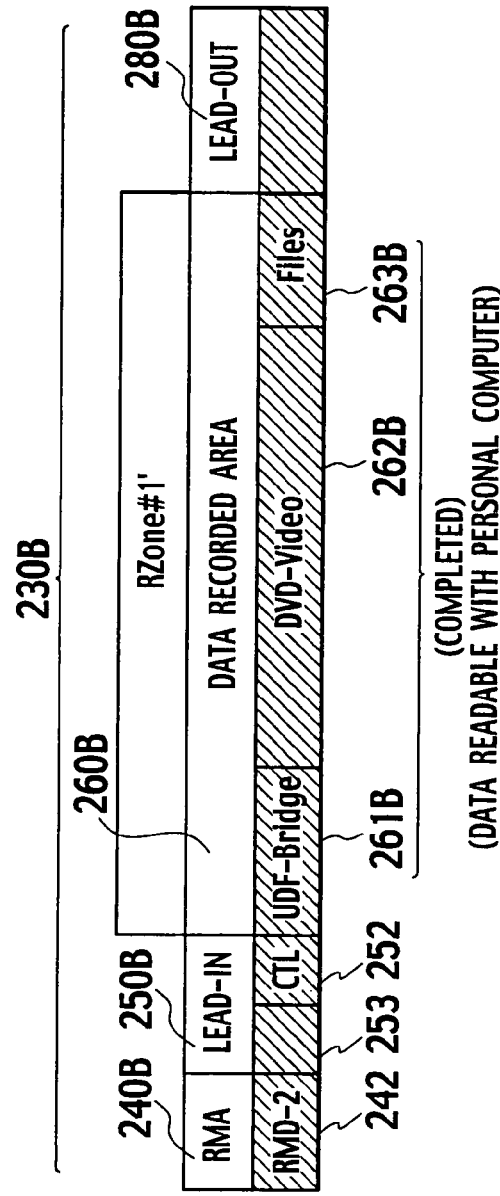

FIGS. 15A and 15B are models showing a signal area of an optical disk according to the modification of the second embodiment in which FIG. 15A shows a signal area 230A' of an optical disk 200A' before inserted into or processed with the personal computer 20 and FIG. 15B shows a signal area 230B of an optical disk 200B after processed with and removed from the personal computer 20.

As shown in FIGS. 15A and 15B, the modification of the second embodiment resembles the second embodiment in that it employs the rewritable optical disk 200A'. Instead of employing the first and second file systems of the second embodiment, the modification employs a single file system, i.e., the UDF-Bridge file system. The unedited optical disk 200A' has a UDF-Bridge file system 261A in the signal area 230A'. The edited optical disk 200B has the signal area 230B that is similar to that of the second embodiment and contains a modified UDF-Bridge file system 261B containing modified data.

In FIG. 15A, the signal area 230A' of the optical disk 200A' before inserted into the personal computer 20 differs from the signal area 230A of the optical disk 200A explained with reference to FIG. 14A in an RZone #1 following a lead-in area 250A.

Namely, the data recorded area 260A' of the optical disk 200A' contains the UDF-Bridge file system 261A conforming to a predetermined optical-disk-standard format instead of the UDF-2.0 file system, as well as application software 266 for creating an information group. The data recorded area 260A' of the optical disk 200A' is a rewritable area.

In FIG. 15B, the signal area 230B of the optical disk 200B after processed with and removed from the personal computer 20 is the same as that of the second embodiment explained with reference to FIG. 14B. The modified UDF-Bridge file system 261B in the RZone #1' following a lead-in area 250B in the optical disk 200B contains different internal data from the original UDF-Bridge file system 261A.

According to the modification of the second embodiment, the rewritable optical disk 200A' has the data recorded area 260A' that holds the UDF-Bridge file system 261A and application software 266 for creating an information group. The application software 266 is information editing/recording application software, is readable with the file system 261A, and is installed in an information processor, i.e., the personal computer 20. For example, a digital camera 11 is used to photograph images, which are stored in the personal computer 20. The application software 266 is used to select desired ones from among the stored images, add back music and comments to the selected images if needed, and edit the selected images in desired order for a slide show, for example. According to instructions from the application software 266, data in the file system 261A is changed upon the creation of the information group, and after the creation of the information group, the modified file system 261B is written over the data recorded area 260A', to thereby partly or entirely delete the unmodified file system 261A and application software 266. At the same time, the information group readable with the modified file system 261B is written in the rewritable area (260A') 270 of the optical disk 200A. As a result, the edited optical disk 200B is provided.

In FIGS. 15A and 15B, the UDF-Bridge file system 261A, application software 266, and virtual allocation table (VAT) 267 are deleted from the RZone #1 of the data recorded area 260A' of the optical disk 200A'. In the optical disk 200B, the lead-in area 250B is followed by the overwritten UDF-Bridge file system 261B. After the file system 261B, the information group is written in the data-deleted rewritable area (260A') and rewritable area 270. This configuration does not limit the present invention. For example, only an essential part of the data recorded area 260A' of the optical disk 200A' may be deleted to make the application software 266 unreadable. In this case, the lead-in area 250B of the optical disk 200B must be followed by the overwritten UDF-Bridge file system 261B, and the information group is written in the remaining part of the area (260A') and the rewritable area 270.

After editing the information group, the UDF-Bridge file system 261A and application software 266 are partly or entirely deleted. Accordingly, the application software 266 is only once installable in the personal computer 20. The optical disk 200B containing the slide-show images is playable with the existing optical disk player 12, to display the slide-show images on the monitor TV 13. Employing the single file system 261A (261B) results in simplifying the file system.

A technical idea of preventing an unauthorized use of the application software 266 after installing the same in the personal computer 20 from the optical disk 200A of the second embodiment or from the optical disk 200A' of the modification of the second embodiment will be explained with reference to FIG. 16.

Figure 16:
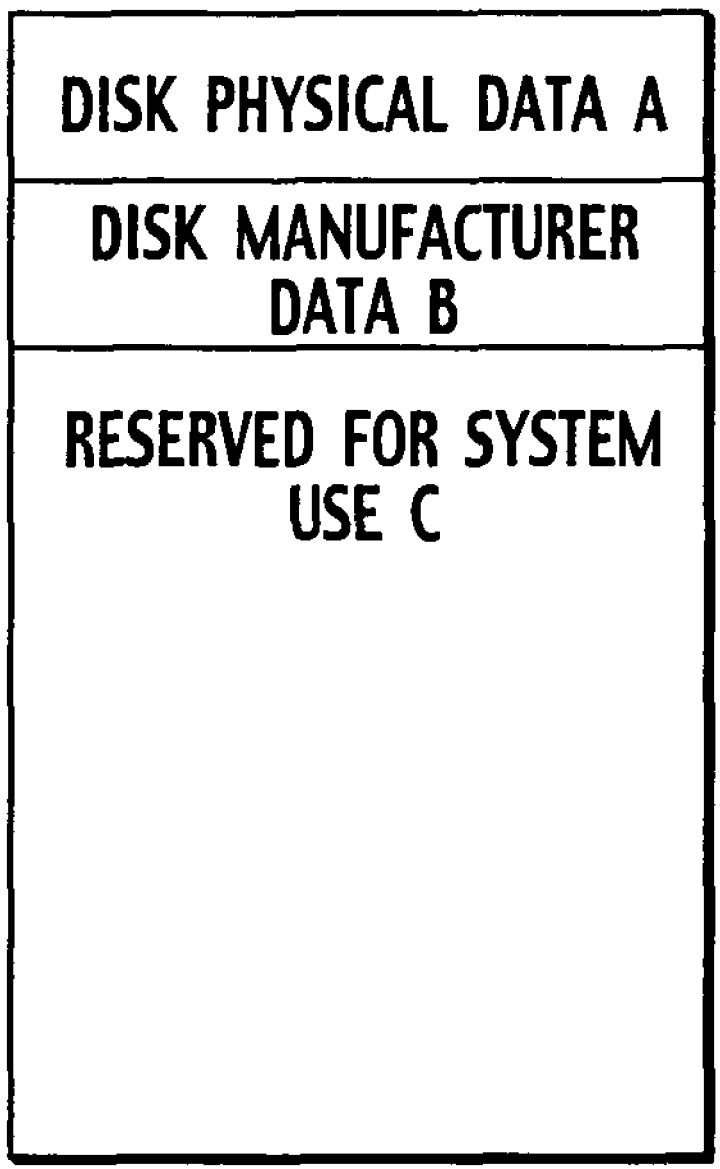
FIG. 16 is a view showing control data (CTL) prerecorded in a lead-in area of the optical disk according to the second embodiment or the modification thereof, the control data being used for preventing an unauthorized use of application software installed in a personal computer.

FIG. 16 is a view explaining the control data 252 prerecorded in the lead-in area of the optical disk according to the second embodiment or the modification of the second embodiment of the present invention. The control data 252 is used to prevent an unauthorized use of application software installed in a personal computer.

In FIG. 16, the control data 252 in the lead-in area 250A includes disk physical data A, disk manufacturer data B, a system reserved section C, and the like. These information pieces are in the form of pre-pits or are prerecorded in the optical disk 200A to be shipped. The user may read the control data 252 with a DVD player or a DVD recorder-player but is unable to alter the control data 252 with the DVD recorder-player.

According to the second embodiment, only a manufacturer is allowed to change at least one of the disk physical data A and disk manufacturer data B in connection with the application software 266 stored in the optical disk 200A of FIG. 14A.

For example, the manufacturer may change the end position of a spiral track of the optical disk shorter than a normal end sector address and writes the end position in the disk physical data A of the control data 252 of the optical disk. Then, no user can alter the disk physical data A, and the shortened end sector address disagrees with the end sector address of any optical disk available in the market. This improves the security of the application software 266.

The disk manufacturer data B of the control data 252 may contain a code that is decodable by the application software 266. The code is used for ensuring the security of the application software 266.

Information corresponding to the disk physical data A and/or disk manufacturer data B contained in the control data 252 may be prerecorded in the application software 266. After installing the application software 266 in a personal computer, the corresponding information may be read from the installed application software 266 and compared with the data stored in the optical disk 200A, to prevent an unauthorized use of the application software 266.

Alternatively, tracks in the optical disk 200A are wobbled, and unauthorized use preventive data is superimposed on wobbling signals or on land pre-pits formed between the wobbled tracks. The wobbled tracks and land pre-pits are formed during the manufacturing of the optical disk, and therefore, are not altered with a DVD recorder-player.

It should be understood that many modifications and adaptations of the invention will become apparent to those skilled in the art and it is intended to encompass such obvious modifications and changes in the scope of the claims appended hereto.

What is claimed is:

1. A method for recording information in an optical disk on which there is a first blank area where information is not recorded, a data recorded area where a first file system and application software for creating an information group are recorded, and a second blank area where information is not recorded, from an inner circumference side toward an outer circumference side of the optical disk, the method comprising:

installing the application software with the first file system into an information processor;

creating the information group by carrying out predetermined processes with the application software in the information processor; and according to instructions from the application software, writing a second file system conforming to a predetermined optical-disk-standard format in the first blank area, writing the created information group readable with the second file system in the first or second blank area at the outer circumference side relative to the second file system, writing lead-out information at the outer circumference side of the second blank area and making the application software and first file system in the data recorded area unreadable with the second file system.

2. The information recording method of claim 1, wherein: the first file system is a UDF-2.0 file system and the second file system is a UDF-Bridge file system.

3. The information recording method of claim 1, wherein: first data is prerecorded at the inner circumference side relative to the first blank area in the optical disk;
second data corresponding to the first data is prerecorded in the application software; and
the second data retrieved from the application software installed in the information processor is compared with the first data.

4. An optical disk comprising an area where first data including at least one of disk physical data and disk manufacturer data is prerecorded, a first blank area where information is not recorded, a once-recordable data recorded area where application software, which includes second data corresponding to the first data, for creating an information group and a first file system for reading the application software are prerecorded, and a second blank area where information is not recorded from the inner circumference side toward the outer circumference side of the optical disk;

the application software having functions of being read in an information processor with the first file system, comparing the second data with the first data, carrying out predetermined processes to create the information group, writing a second file system conforming to a predetermined optical-disk-standard format in the first blank area, writing the created information group readable with the second file system in the first or second blank area at the outer circumference side relative to the second file system, and making the application software and first file system stored in the data recorded area unreadable with the second file system.

* * * * *